US012178202B2

(12) United States Patent
Nguyen et al.

(10) Patent No.: US 12,178,202 B2
(45) Date of Patent: Dec. 31, 2024

(54) INSECT MONITORING SYSTEM AND METHOD

(71) Applicant: RYNAN TECHNOLOGIES PTE. LTD., Paya Lebar Square (SG)

(72) Inventors: My T. Nguyen, Tra Vinh (VN); Cuong Q. Hong, Tra Vinh (VN); Toan Q. Tran, Cang Long District (VN); Phuong H. Son, Chau Thanh District (VN); Luom H. Pham, Long Ho District (VN); Quy M. Phan, Tra Vinh (VN); Nam Q. Doan, Chau Thanh District (VN)

(73) Assignee: RYNAN TECHNOLOGIES PTE. LTD., Paya Lebar Square (SG)

( * ) Notice: Subject to any disclaimer, the term of this patent is extended or adjusted under 35 U.S.C. 154(b) by 201 days.

(21) Appl. No.: 18/009,591

(22) PCT Filed: Jun. 9, 2020

(86) PCT No.: PCT/IB2020/055427
§ 371 (c)(1),
(2) Date: Dec. 9, 2022

(87) PCT Pub. No.: WO2021/250444
PCT Pub. Date: Dec. 16, 2021

(65) Prior Publication Data
US 2023/0210101 A1    Jul. 6, 2023

(51) Int. Cl.
*A01M 1/08* (2006.01)
*A01M 1/02* (2006.01)
(Continued)

(52) U.S. Cl.
CPC .............. *A01M 1/08* (2013.01); *A01M 1/026* (2013.01); *A01M 1/06* (2013.01); *A01M 1/10* (2013.01);
(Continued)

(58) Field of Classification Search
CPC .......... A01M 1/026; A01M 1/06; A01M 1/08
See application file for complete search history.

(56) References Cited

U.S. PATENT DOCUMENTS 3,939,802 A  *  2/1976  Neff ........................ A01M 1/08
                                                    119/51.04
5,157,865 A  *  10/1992  Chang ..................... A01M 1/08
                                                    43/113
(Continued)

FOREIGN PATENT DOCUMENTS

CN       105868824 A      8/2016
CN       107372413 A      11/2017
(Continued)

OTHER PUBLICATIONS

International Patent Application No. PCT/IB2020/055427 International Search Report and Written Opinion (corrected version) dated Dec. 2, 2021, 12 pages.

*Primary Examiner* — Jessica B Wong
(74) *Attorney, Agent, or Firm* — Cozen O'Connor

(57) ABSTRACT

An insect monitoring system (ISM) and related e-commerce system are provided. The ISM includes an insect attracting light, an intake, an exhaust, an airflow conduit between intake and exhaust, an insect collecting mesh in the conduit, a fan for generating airflow in the airflow conduit, and one or more cameras pointed on the insect collecting mesh. The insect attracting light and the fan are activated such that insects are drawn into the intake and trapped against the insect collecting mesh. The images of the insect collecting mesh are processed and analyzed using a machine learning
(Continued)

algorithm to recognize a type and number of insects. Recommendations are provided based on the analysis. In some aspects, the insect monitoring system is connected to electronic client devices over a communication network. The electronic devices are provided with an e-commerce application for sale of products and services responsive to the recommendations.

20 Claims, 28 Drawing Sheets

(51) Int. Cl.
*A01M 1/06* (2006.01)
*A01M 1/10* (2006.01)
*G06Q 30/0601* (2023.01)
*G06V 10/82* (2022.01)
*G06V 40/10* (2022.01)

(52) U.S. Cl.
CPC ..... *A01M 2200/01* (2013.01); *G06Q 30/0631* (2013.01); *G06V 10/82* (2022.01); *G06V 40/10* (2022.01)

(56) References Cited

U.S. PATENT DOCUMENTS

| | | | |
|---|---|---|---|
| 2017/0112116 A1 | 4/2017 | Ji et al. | |
| 2017/0273291 A1 | 9/2017 | Yoo et al. | |
| 2019/0090470 A1* | 3/2019 | Lee | A01M 1/04 |
| 2023/0270097 A1* | 8/2023 | Brey | A01M 1/02 |
| | | | 43/113 |

FOREIGN PATENT DOCUMENTS

| | | |
|---|---|---|
| CN | 108734277 A | 11/2018 |
| CN | 109726700 A | 5/2019 |
| CN | 110495434 A | 11/2019 |
| CN | 110973089 A | 4/2020 |
| EP | 3482630 A1 | 5/2019 |

* cited by examiner

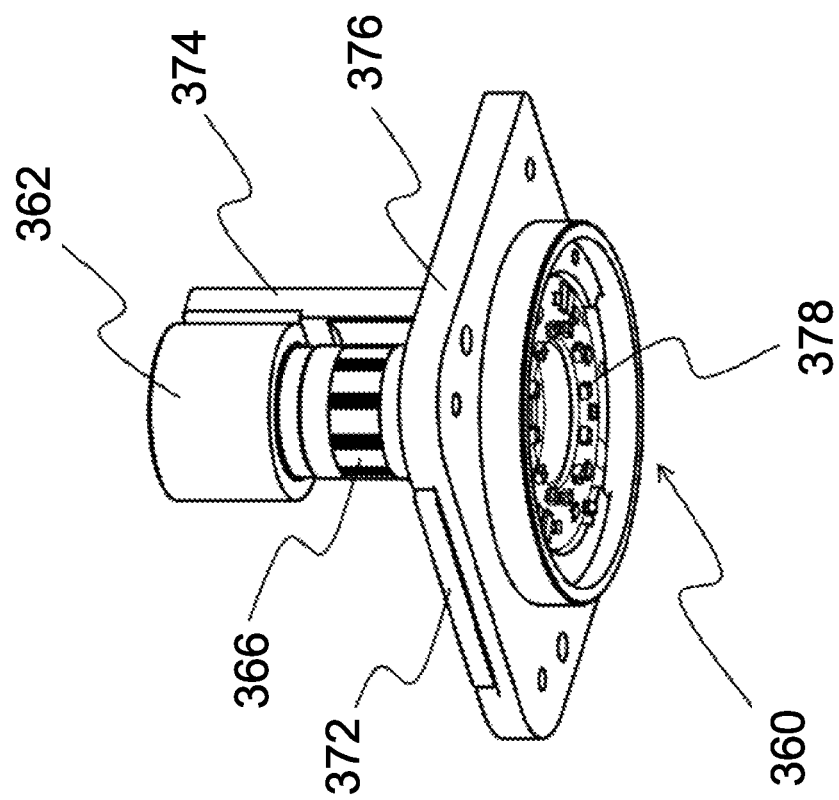
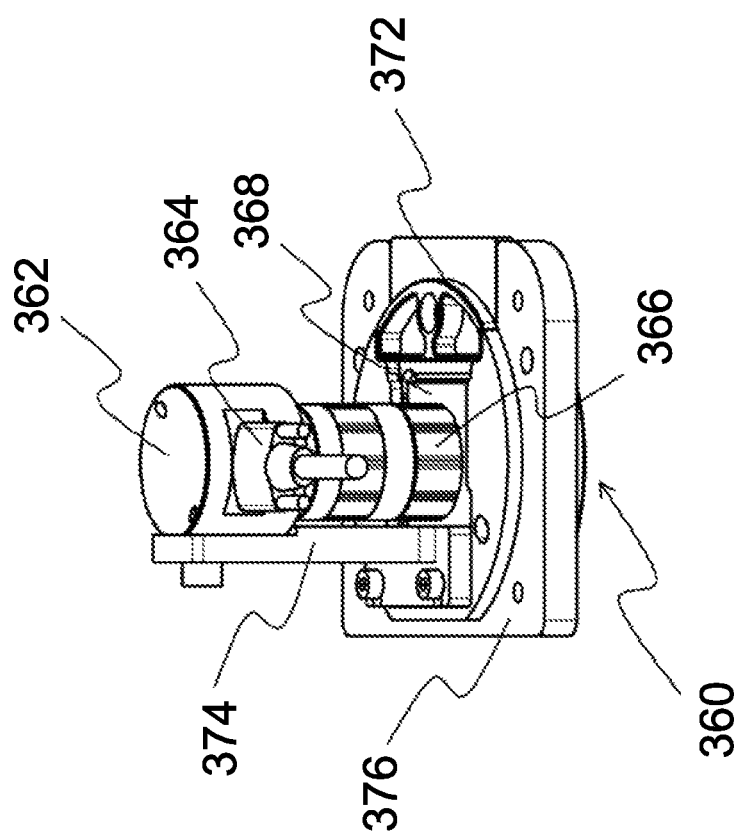
Figure 9B
Figure 9A

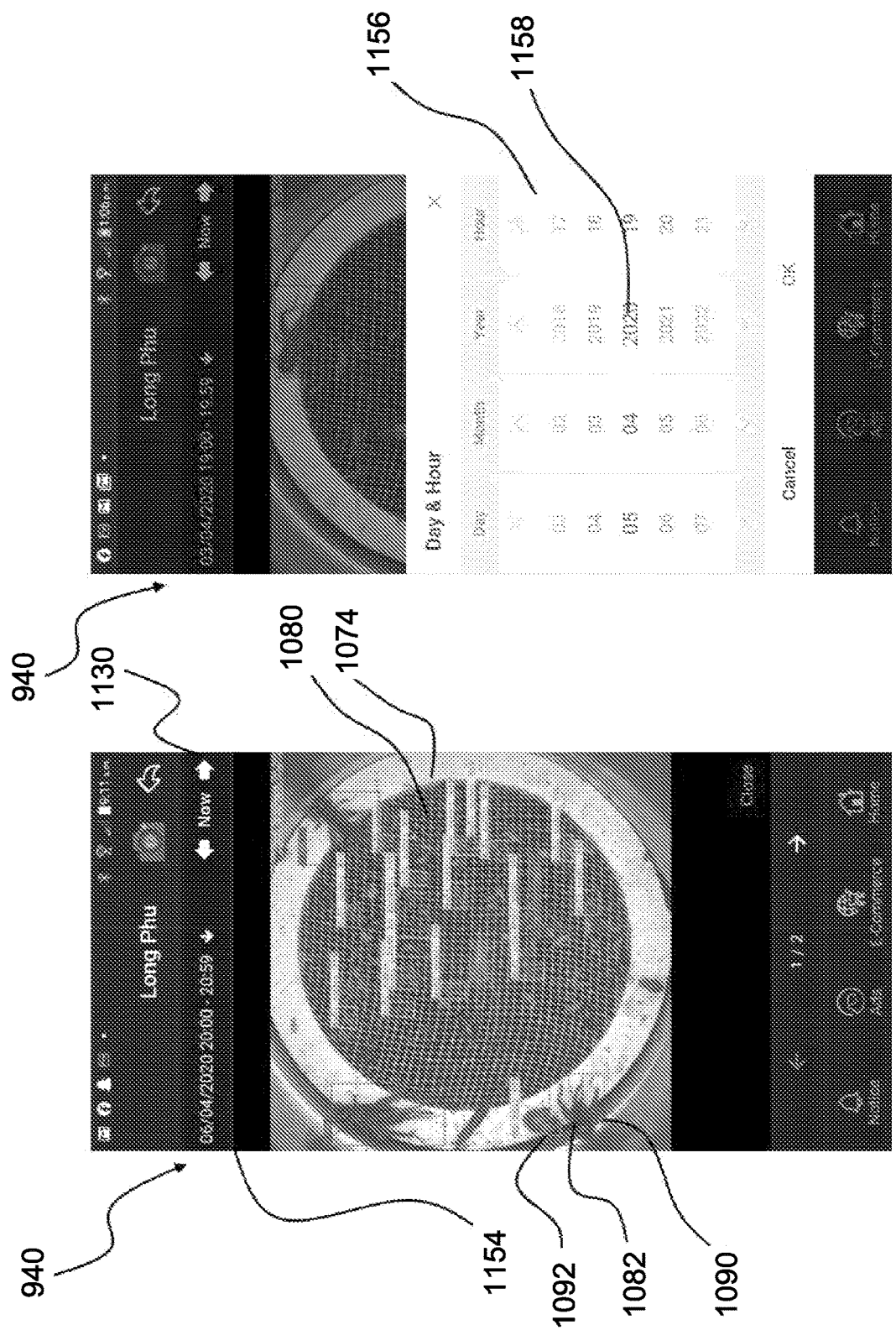

INSECT MONITORING SYSTEM AND METHOD

CROSS-REFERENCE TO RELATED APPLICATIONS

This application is a 35 U.S.C. § 371 filing of International Application No. PCT/IB2020/055427 filed Jun. 9, 2020, and titled "Insect Monitoring System and Method," the entirety of which is incorporated by reference.

FIELD

The present technology relates to an insect monitoring system and a method for operating the insect monitoring system.

BACKGROUND

In many regions of the world, agriculture lands being used to grow crops are adversely affected by pests such as insects, which destroy portions of the crops and reduce yield. The global losses of crop production are estimated annually between 20 and 40 percent. Invasive insects and plant diseases cost the global economy around US$290 billion each year.

In many cases pesticides are used to control pests within an area. However the use of pesticides such as insecticides is based on information which is typically outdated and not representative of the actual presence of given types of insects within the area at a particular point in time thereby reducing its effectiveness and perhaps causing waste or harm to the environment. For instance, many other insects, such as bees and the like, may not adversely affect the crops or may actually be beneficial by pollinating plants and feeding on the insects which are pests, and these useful insects or arachnids may also be adversely affected by indiscriminate spraying of pesticides.

Integrated insect management (IPM) is an ecological approach to help reducing losses of crop production and reducing plant diseases due to insects through a combination of techniques such as biological control, habitat manipulation, modification of cultural practices, planting with insect resistant varieties, and limiting use of chemical pesticides, while minimizing risks to people and the environment. Identification and monitoring populations of insects and their natural enemies are important components for the implementation of a successful IPM program.

SUMMARY

In accordance with a broad aspect of the present technology, there is provided an insect monitoring system comprising: an insect attracting light, an intake positioned adjacent the insect attracting light, a channel extending from the intake to an end portion, an insect collecting net (ICN) positioned between the intake and the end portion, a fan for creating an airflow between the intake and the end portion, a camera positioned opposite an airflow side of the ICN, and a controller operatively connected to each of the insect attracting light, the fan, and the camera. The controller is operable to cause: activation of the insect attracting light, activation of the fan such that insects attracted by the insect attracting light are drawn into the intake by the airflow and trapped against the ICN, and acquisition of an image of the ICN by the camera.

In one or more embodiments of the insect monitoring system, the end portion of the channel comprises an exhaust.

In one or more embodiments of the insect monitoring system, the controller is operable to cause: deactivation of the insect attracting light, and deactivation of the fan.

In one or more embodiments of the insect monitoring system, the insect monitoring system further comprises: a servo motor rotatively connected to the ICN, the controller is further configured to cause activation of the servo motor to rotate the ICN to release insects via the exhaust.

In one or more embodiments of the insect monitoring system, the insect monitoring system further comprises: a further servo motor rotatively connected to a cleaning mechanism located below the ICN, the cleaning mechanism comprising at least one blade, the controller is further configured to cause activation of the further servo motor to induce a rotative motion to the at least one blade.

In one or more embodiments of the insect monitoring system, the insect monitoring system further comprises a lighting array positioned adjacent the camera for illuminating the ICN, and the controller is further configured to cause activation of the lighting array in the insect attraction mode, and deactivation of the lighting array in the stand-by mode.

In one or more embodiments of the insect monitoring system, the insect attracting light comprises a set of light emitting diodes (LEDs).

In one or more embodiments of the insect monitoring system, the insect attracting light is configured for emitting light at a wavelength between 350 and 650 nm.

In one or more embodiments of the insect monitoring system, the controller is configured to operate in the one of the insect attraction mode and the stand-by mode according to a predetermined schedule.

In one or more embodiments of the insect monitoring system, the insect monitoring system further comprises comprising a power source connected to the controller.

In one or more embodiments of the insect monitoring system, the power source comprises a solar panel.

In one or more embodiments of the insect monitoring system, the power source comprises a battery.

In one or more embodiments of the insect monitoring system, the insect monitoring system further comprises a communication module for transmitting and receiving data over a communication network.

In one or more embodiments of the insect monitoring system, the insect monitoring system further comprises: a processor operatively connected to the camera, the processor having access to a machine learning algorithm (MLA) having been trained for insect recognition, the processor being configured for: receiving the image of the ICN, analyzing, using the MLA, the image to recognize a set of insects, each recognized insect being associated with an insect identifier indicative of a type of insect, and outputting the set of recognized insects.

In one or more embodiments of the insect monitoring system, each recognized insect is associated with a prediction score indicative of a confidence of the MLA in recognizing the insect.

In one or more embodiments of the insect monitoring system, each recognized insect is associated with a bounding box indicative of an approximate location and size of the recognized insect in the image.

In one or more embodiments of the insect monitoring system, each recognized insect is associated with a mask at least partially indicative of pixels belonging to the recognized insect in the image.

In one or more embodiments of the insect monitoring system, the outputting the set of recognized insects comprises outputting a number of each type of recognized insect.

In one or more embodiments of the insect monitoring system, the MLA comprises a convolutional neural network (CNN).

In one or more embodiments of the insect monitoring system, the MLA comprises a region proposal network (RPN).

In one or more embodiments of the insect monitoring system, the insect monitoring system further comprises: determining, based on the set of recognized insects, a ratio of natural enemies in the set of recognized insects.

In one or more embodiments of the insect monitoring system, the insect monitoring system is connected to a database, the processor is further configured for: querying the database based on the set of recognized insects to obtain insecticide recommendations.

In accordance with a broad aspect of the present technology, there is provided a system comprising: an insect monitoring system comprising: an insect attracting light, an intake positioned adjacent the insect attracting light, a channel extending from the intake to an end portion, an insect collecting net (ICN) positioned between the intake and the end portion, a fan for creating an airflow between the intake and the end portion to draw insects attracted by the insect attracting light into the intake and trap the insects against the ICN, and a camera positioned opposite an airflow side of the ICN, the camera being operable to acquire images of the ICN, and a server connected to the insect monitoring system, the server executing a machine learning algorithm (MLA) having been trained for insect recognition, the server being operable to: receive an image of the ICN acquired by the camera, analyzing, using the MLA, the image to recognize a set of insects, each recognized insect being associated with an insect identifier indicative of a type of insect, and outputting the set of recognized insects.

In one or more embodiments of the system, the system further comprises: a client device connected to the server, the client device being operable to receive the set of recognized insects from the server.

In one or more embodiments of the system, the client device is connected to the insect monitoring system In one or more embodiments of the system, the server is further configured for: determining, based on the set of recognized insects, insecticide recommendations, and transmitting the insecticide recommendations for display to the client device.

In one or more embodiments of the system, prior to determining the insecticide recommendations: receiving currently used insecticides, the determining the insecticide recommendations is further based on the currently used insecticides.

In one or more embodiments of the system, the insecticide recommendations comprises: an insecticide type, and an associated insecticide quantity.

In one or more embodiments of the system, the insecticide recommendation further comprises: an associated price.

In one or more embodiments of the system, the server is further configured for: determining, based on the set of recognized insects, insecticide recommendations, and transmitting the insecticide recommendations to the client device.

In one or more embodiments of the system, the transmitting the insecticide recommendations to the client device comprises transmitting an indication of an additional product.

In one or more embodiments of the system, the indication of the additional product comprises at least one of: an agricultural product, a food product, a component of the insect monitoring system, and a service.

In accordance with a broad aspect of the present technology, there is provided a method of operating an insect monitoring system, the insect monitoring system comprising: an insect attracting light, an intake positioned adjacent the insect attracting light, an exhaust, an insect collecting net (ICN) positioned between the intake and the exhaust, a fan for creating an airflow between the intake and the exhaust, and a camera positioned opposite an airflow side of the ICN. the method comprises: activating the insect attracting light, activating the fan such that insects attracted by the insect attracting light are drawn into the intake by the airflow and trapped against the ICN, and activating the camera to capture an image of the ICN.

In one or more embodiments of the method, the insect monitoring system further comprises a servo motor rotatively connected to the ICN, and the method further comprises: activating the servo motor to rotate the ICN to release insects via the exhaust.

In one or more embodiments of the method, the insect monitoring system is connected to an electronic device over a communication network, the method further comprises: transmitting, to the electronic device, the image of the ICN.

In one or more embodiments of the method, the method further comprises: deactivating the insect attracting light, deactivating the fan such that insects attracted by the insect attracting light are drawn into the intake by the airflow and trapped against the ICN.

In one or more embodiments of the method, the insect monitoring system comprises a controller operatively connected to each of the insect attracting light, the fan and the camera, the method is executed by the controller.

In accordance with a broad aspect of the present technology, there is provided a method for providing recommendations based on recognized insects. The method is executed by a processor, the processor having access to a machine learning algorithm (MLA) having been trained for insect recognition. The processor is connected to a database, and to a client device, the method comprises: receiving an image, extracting a set of features from the image, determining, based on the set of features, a set of recognized insects, each recognized insect being associated with an insect identifier associated with an insect type, acquiring, from the database, based on the set of recognized insects, a set of recommendations, acquiring from the database, a set of products, and transmitting, to the client device, the set of recommendations and the set of products.

In one or more embodiments of the method, the set of products comprises at least one of: an agricultural product, a food product, a component of the insect monitoring system, and a service.

In one or more embodiments of the method, the set of recommendations includes insecticide recommendations.

BRIEF DESCRIPTION OF THE DRAWINGS

FIG. 9A and FIG. 9B provide perspective views of the insect monitoring system in accordance with one or more non-limiting embodiments of the present technology.

DETAILED DESCRIPTION

Insect Monitoring System

Figure 1:
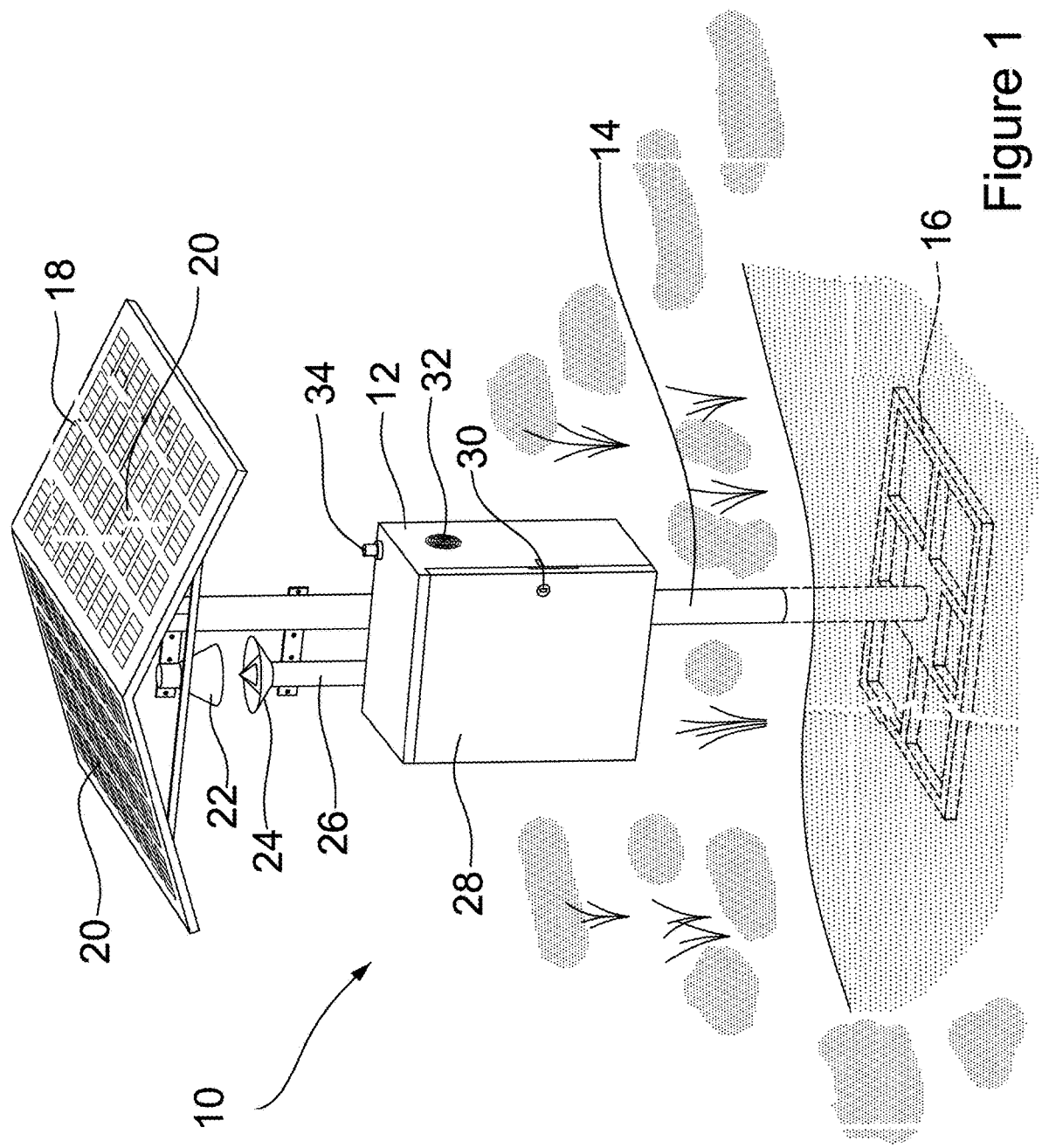
FIG. 1 provides a perspective view of an insect monitoring system in accordance with one or more non-limiting embodiments of the present technology.

Referring now to FIG. 1, an insect monitoring system 10 will now be described in accordance with one or more non-limiting embodiments of the present technology. The insect monitoring system 10 comprises a housing 12 mounted to a pole 14 which is supported and maintained upright by a stand 16. A roof 18 comprising a pair of solar panels 20 is mounted atop the pole 14. In one or more embodiments, the stand 16 may be buried under the ground to prevent movement and improve stability of the insect monitoring system 10. As a non-limiting example, each of the housing 12, the pole 14 and the stand 16 may be made from galvanized metal.

Still referring to FIG. 1, an insect luring lamp 22 including a set of light-emitting diode (LEDs) (not shown in FIG. 1) for attracting insects is positioned opposite a conical intake 24 which comprises a tube 26 providing a point of entry into the housing 12. Entry to the housing 12 is via a door 28 which may be secured and closed via a lock 30. A vent 32 may be provided on the housing 12 allowing for the circulation of air within the housing 12. An antenna 34 is also mounted on the housing 12 and interconnected with electronics (not shown in FIG. 1) stored within the housing 12.

Figure 2:
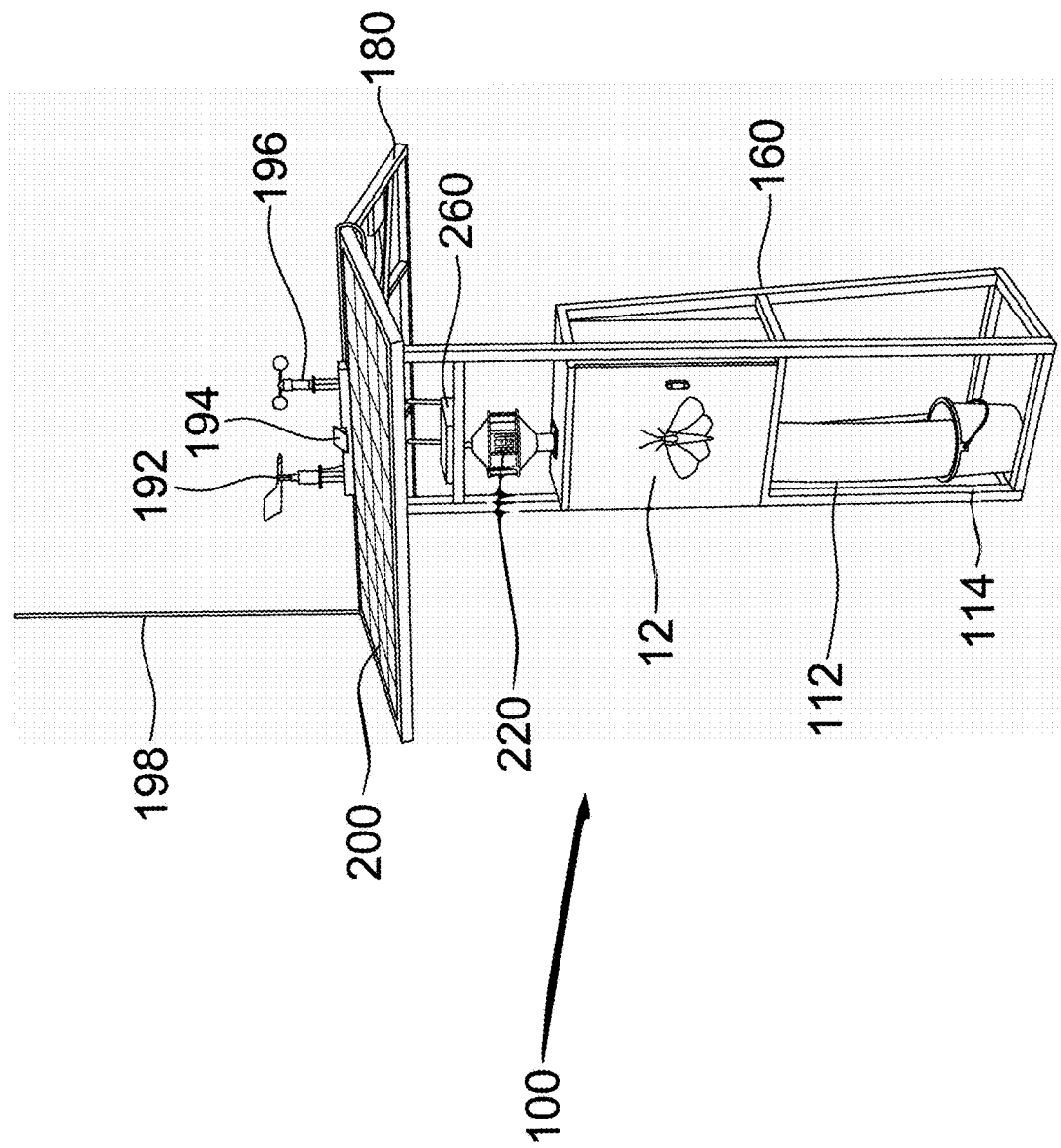
FIG. 2 provides a perspective view of insect monitoring system in accordance with one or more other non-limiting embodiments of the present technology.

FIG. 2 illustrates an insect monitoring system 100 in accordance with one or more other non-limiting embodiments of the present technology. The insect monitoring system 100 is similar to the insect monitoring system 10 and includes a housing 12 mounted on a frame 160. As a non-limiting example, the frame 160 may be made of stainless steel. A roof 180 comprising a pair of solar panels 200 is mounted on top of the frame 160. The roof 180 comprises an anti-lightning rod 198 which may be made from copper, a wind vane 192, a rain gauge sensor 194, and an anemometer 196. It will be appreciated that one or more of the wind vane 192, the rain gauge sensor 194, and the anemometer 196 may be optional.

The frame 160 includes a networking device 260 which enables connecting the insect monitoring system 100 to one or more communication networks (not depicted in FIG. 1). The networking device 260 is connected to electronics stored within the housing 12 for transmission and reception of data. In the embodiment illustrated in FIG. 2, the networking device 260 is located under the roof 180 but it will be appreciated that the networking device 260 may be located elsewhere. One or more of the wind vane 192, the rain gauge sensor 194, and the anemometer 196 may be communicatively coupled to the networking device 260 and/or the electronics within housing 12 for transmission and reception of data. It will be appreciated that the networking device 260 may be implemented as one or more of a gateway, a router, a switch, a bridge, a repeater, and a wireless access point (WAP).

Figure 4A:
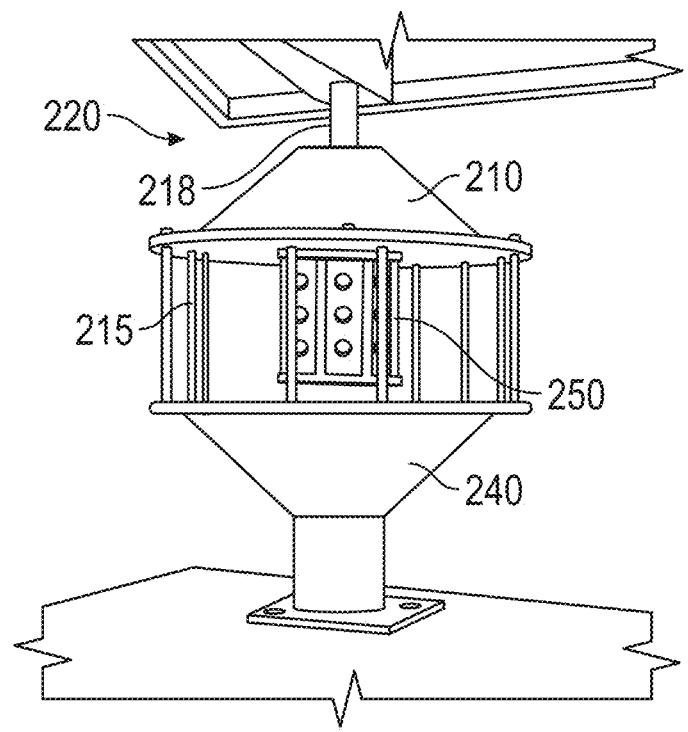
FIG. 4A and FIG. 4B provide a perspective view of the insect luring lamp of the insect monitoring system of FIG. 2.

Also referring to FIG. 4A, an insect luring lamp 220 includes a set of LEDs 250 for attracting insects is positioned opposite a conical intake 240 which comprises a tube 260 providing a point of entry into the housing 12. Entry to the housing 12 is via a door (not numbered) which may be secured and closed via a lock (not numbered). A vent (not numbered) may be provided on the housing 12 allowing for the circulation of air within the housing 12. An insect disposing net 112 extends downwardly from the housing 12 into a disposal bucket 114 for discarding insects from the housing 12. It will be appreciated that while the insect luring lamp 220 comprises LEDs, the insect luring lamp 220 may include other types of light emitting devices such as incandescent bulbs, fluorescent lamps, halogen lamps, compact fluorescent lamps (CFL), and the like.

Figure 3:
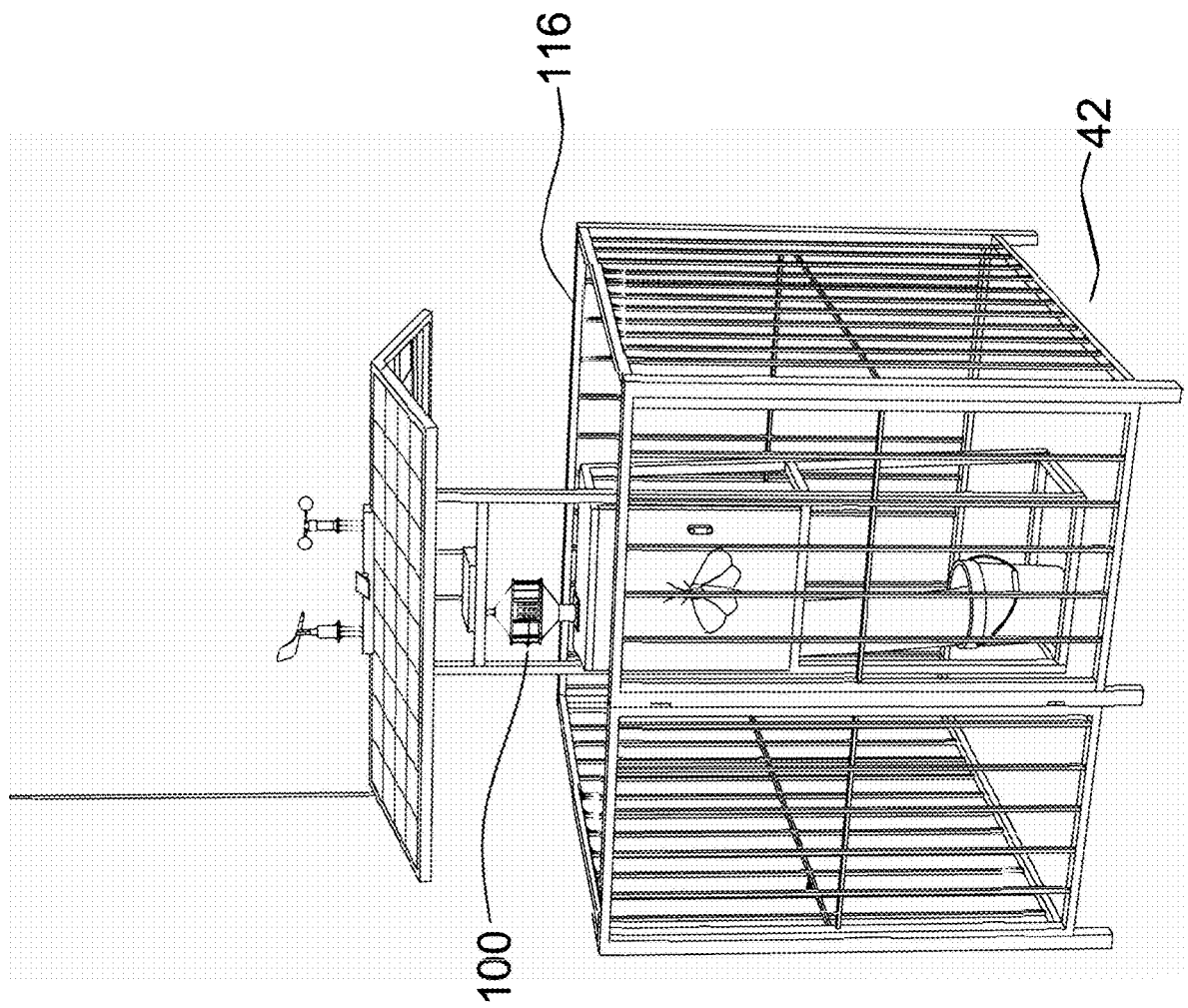
FIG. 3 provides a perspective view of the insect monitoring system of FIG. 2 surrounded by a fence in accordance with one or more non-limiting embodiments of the present technology.

FIG. 3 depicts the insect monitoring system 100 surrounded by a fence 116. In the illustrated embodiment the frame 160 may stand on a stable surface such as cement and graveled foundation or soil surface. The fence 116 is used to prevent vandalism of the insect monitoring system 100 and as a non-limiting example may be made of galvanized metal. The height of the fence 116 is lower than a height of the insect luring lamp 220 to enable insects to fly freely towards the insect luring lamp 220 when the LEDs 250 are activated, and to prevent spider webs from catching insects when insects fly towards the insect luring lamp 220. As a non-limiting example, the metal bars of the fence 116 may be positioned vertically with a 15 cm spacing between each bar for facilitating periodical cleaning of the spider webs. It will be appreciated that other configurations of the fence 116 may be possible.

Figure 4B:
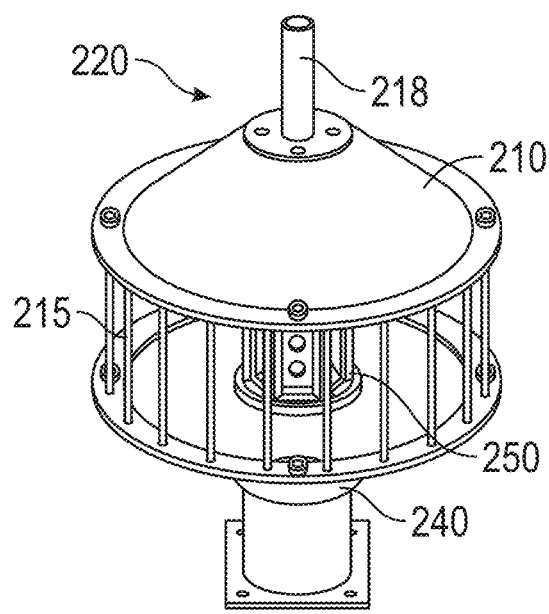

With reference to FIGS. 4A and 4B, in accordance with one or more non-limiting embodiments of the present technology, the insect luring lamp 220 includes a set of LEDs 250 with 12 UV LEDs (3 W, 380 nm) and 6 LEDs emitting in the red, green, and blue color spectrum (3 W). It will be appreciated that the set of LEDs 250 may include a different number of LEDs which emit in a range between 350 and 650 nm. In one or more embodiments, a given one of the set of LEDs 250 may selectively emit light in a plurality of wavelengths. In one or more embodiments, one or more of the set of LEDs 250 may emit in a wavelength The set of LEDs 250 are secured to a top lamp shade 210, which is secured to a bottom face of the roof 180 via a lamp holder 218. The top lamp shade 210 is connected to a bottom lamp shade 240 or conical intake 240 via metal rods 215. The metal rods 215 may be spaced with at least 3 cm between each rod as a non-limiting example to prevent insects or animals with having a wingspan larger than 5 cm from being caught by the insect monitoring system 100.

Housing

Figure 5:
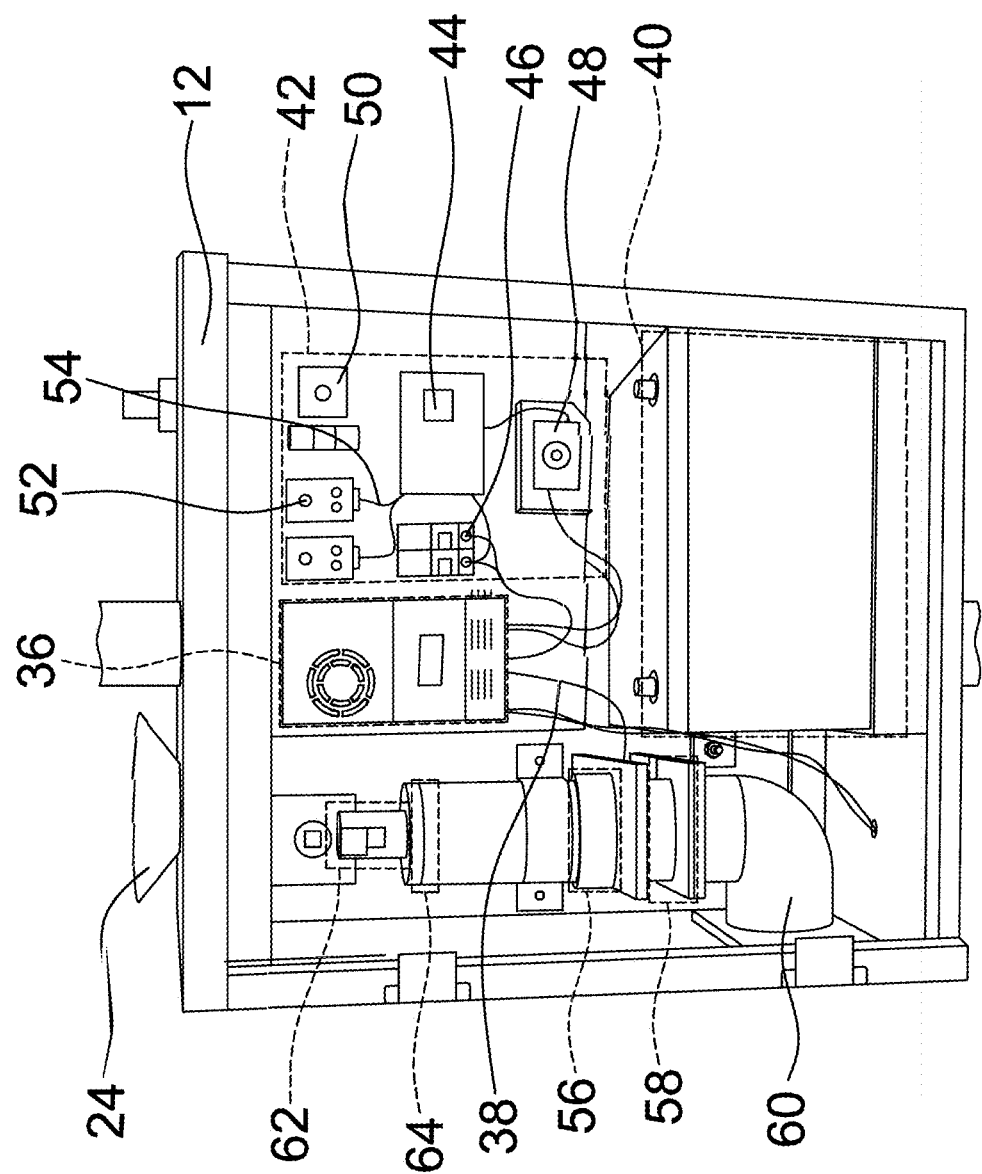
FIG. 5 provides a partial front plan view of a cabinet housing various subsystem of the insect monitoring system in accordance with one or more non-limiting embodiments of the present technology.

Referring now to FIG. 5, various devices or components disposed within the housing 12, 120 and illustratively divided into subsystems to ensure the correct operation of the insect monitoring system 10,100 will be described in accordance with non-limiting embodiments of the present technology.

It will be appreciated the housing 12, 120 may include one or more of the subsystems described below.

A solar power generation and storage subsystem (not numbered) is provided and comprises a solar converter 36 which regulates electricity produced by the solar panels 20, 200 and relayed to the solar converter 36 via electrical conductors 38 such that it can be stored in a battery 40. This enables providing electrical energy to power at least partially the insect monitoring system 10, 100.

An electronics subsystem 42 comprises a controller 44, relays 46, current and voltage regulation 48, a GPS module 50, a network interface 52 as well as the LEDs (not shown in FIG. 5) to which the electronics subsystem is 42 connected via a multi-conductor power cable 54. The GPS module 50 may enable locating the insect monitoring system 10, 100 and the network interface 52 may enable connecting the insect monitoring system 10, 100 to a communications network (not depicted in FIG. 5) via the networking device 260 for transmission and reception of data. It will be appreciated that one or more components of the electronic subsystem 42 may be optional.

In one or more embodiments, the electronic subsystem 42 may further comprise a processor operatively connected to a non-transitory storage medium which may be used as a computer and/or for other purposes (not depicted). The electronic subsystem 42 will be described in more herein below in accordance with one or more non-limiting embodiments of the present technology.

An insect capture and release subsystem (not numbered) is provided and comprises the conical intake 24 connected to an insect collecting net (ICN) assembly 56 which is connected to a fan assembly 58 and an exhaust 60. A camera subsystem is also provided comprising a camera 62 directed towards the ICN assembly 56 as well as an associated LED lighting array 64 for illuminating the ICN assembly 56 when the camera 62 is activated for capturing images. The insect luring lamp 22 is mounted to the pole 14 via an adjustable bracket 66 and such that the displacement of the insect luring lamp 22 relative to the mouth 68 of the conical intake 24. As a non-limiting example, the adjustable bracket 55 may be made from galvanized steel.

Insect Capture and Release Subsystem

Figure 6:
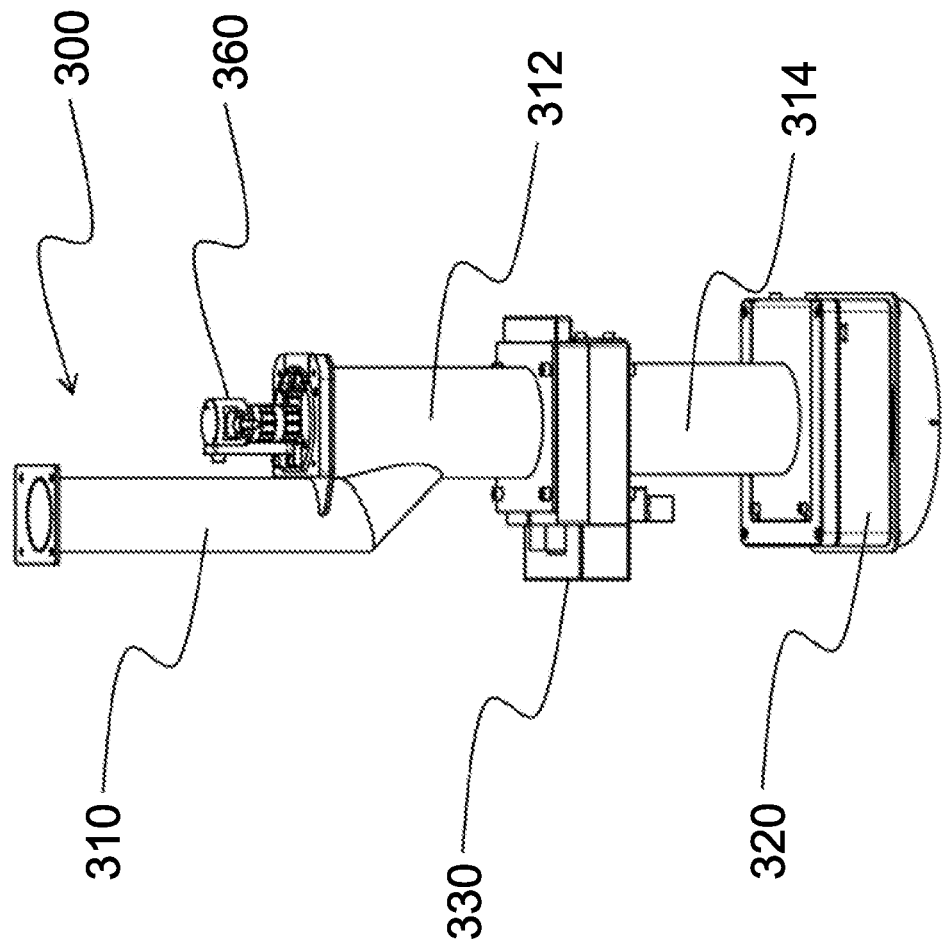
FIG. 6 provides a perspective view of an insect capture and release subsystem of the insect monitoring system in accordance with one or more non-limiting embodiments of the present technology.

With reference to FIG. 6, an insect capture and release subsystem 300 will be described in accordance with one or more non-limiting embodiments of the present technology.

The insect capture and release subsystem 300 is located within the housing 12 (not shown in FIG. 6) and includes a first pipe 310 extending downwardly from the conical intake 240 (not shown in FIG. 6) and connecting to a lateral surface of a second pipe 312 with a camera subsystem 360 positioned above an upper opening of the second pipe 312. The second pipe 312 extends downwardly and is connected to an insect collecting net (ICN) assembly 330. The ICN assembly 330 is connected to a removable pipe 314 which extends downwardly and is connected to a fan assembly 320. The removable pipe 314 may be periodically removed for cleaning insects and dirt. As a non-limiting example, the first pipe 310 may have a diameter of 60 mm and may be made from stainless steel. The second pipe 312 and the removable pipe 314 may each have 90 mm diameter and may be made from stainless steel.

Insect Collecting Net (ICN) Assembly

Figures 7A, 7B:
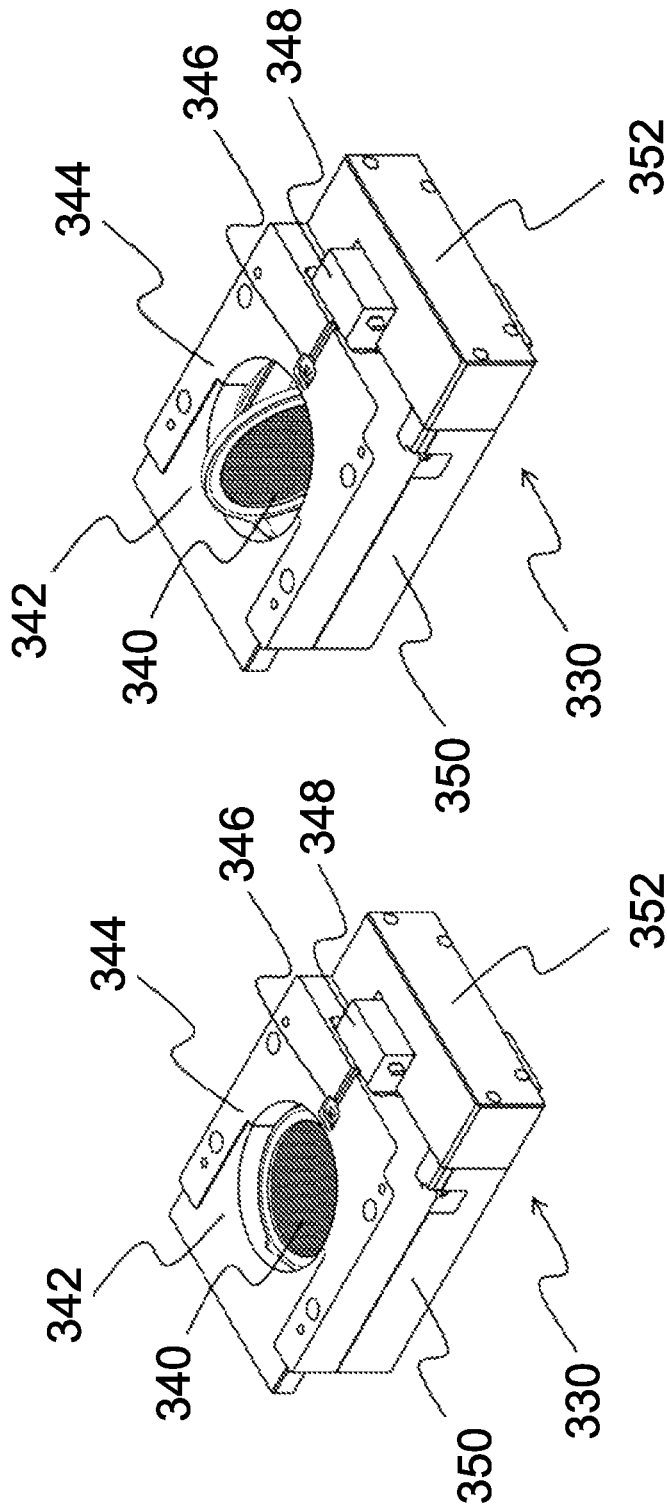
FIGS. 7A and 7B provide a perspectives views of an insect collecting net assembly of the insect monitoring system in accordance with one or more non-limiting embodiments of the present technology.
Figure 7C:
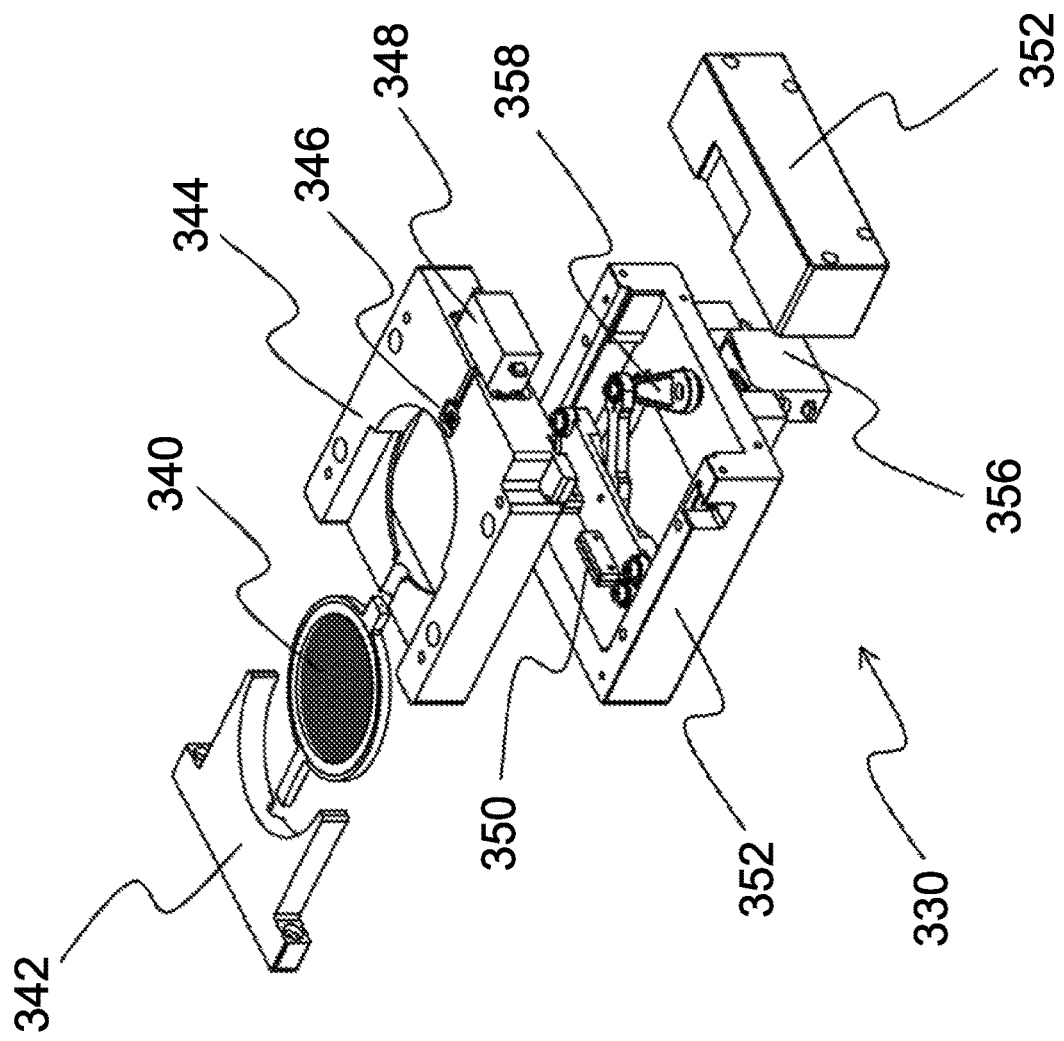
FIG. 7C provides an exploded view of the insect collecting net assembly of the insect monitoring system in accordance with one or more non-limiting embodiments of the present technology.

With reference to FIG. 7A to FIG. 7C, the insect collecting net (ICN) assembly 330 will be described. The ICN assembly 330 includes an ICN 340 in the form of a mesh which is sized and shaped to receive insects of various size attracted by the set of LEDs 250 which are then sucked up by the fan 322 in the insect capture and release subsystem 300. It will be appreciated that the ICN 340 may have a different shape and be made from various materials without departing form the scope of the present technology.

The ICN 340 is rotatably connected to a removable ICN holder 342 such that the ICN 340 may be rotated along a lateral axis to release insects after images are captured by the camera 362. The ICN 340 may be rotatably secured to the removable ICN holder 342 via arms on opposite sides. The ICN assembly 330 includes a top base 344 with a recess in which a rotation sensor 346 is mounted for detecting the rotation parameters of the ICN 340. The ICN assembly 330 includes a first servo motor 348 operatively and rotatably connected to the arm 338 or shaft of the ICN 340. The first servo motor 348 may be activated to rotate the ICN 340 such that insects located on a top surface of the ICN 340 end up at the bottom surface of the ICN 340 and may not escape from the intake 24, 240 via the first pipe 310 and the second pipe 312 but may rather escape via the exhaust 60 (best seen on FIG. 5).

As best seen in FIG. 7C, the top base 344 is disposed on a bottom base 350 which comprises a base cover 352, and a cleaning mechanism 358 which is connected to a second servo motor 356, The second servo motor 356 may be activated to induce rotative motion to the cleaning blades of the cleaning mechanism 358 for cleaning at least a portion of the ICN assembly 330 by removing insects and/or dust. a non-limiting example, the top base 344, the bottom base 350, the base cover 352, and the cleaning mechanism 358 may be made from aluminum, and the cleaning blades of the cleaning mechanism 358 may be made from silicon.

Figure 8:
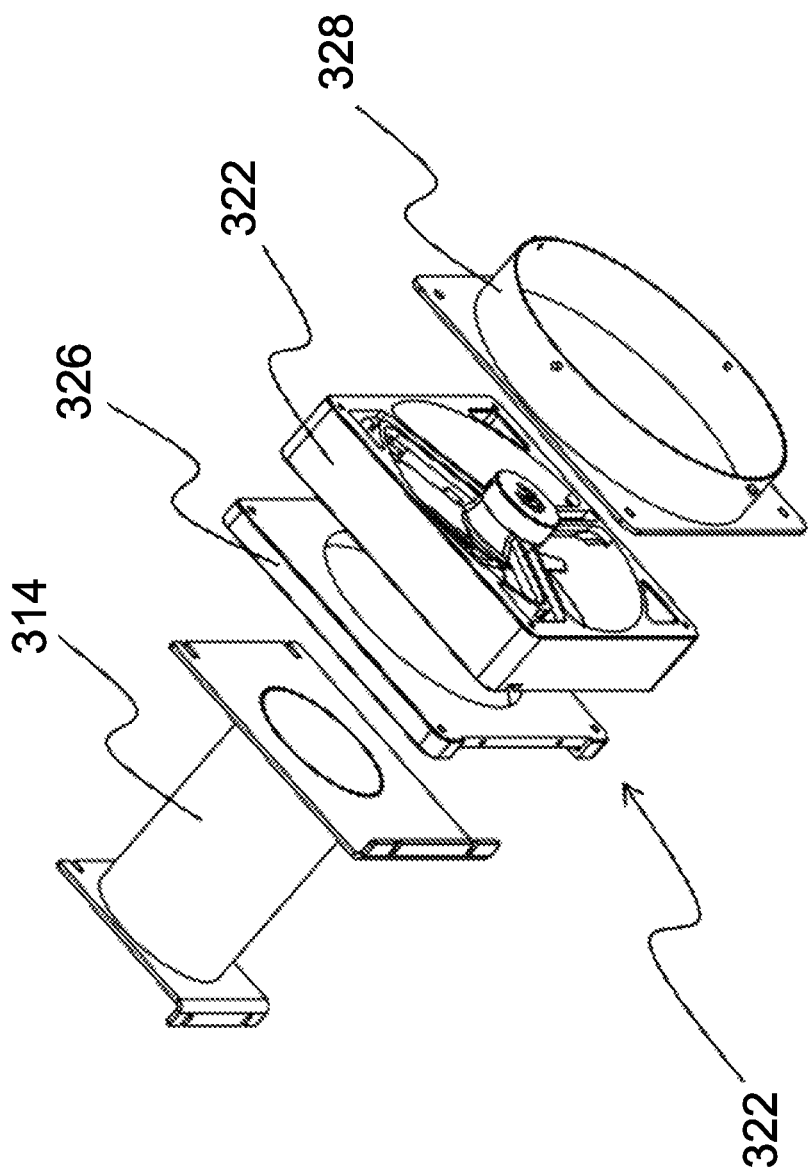
FIG. 8 provides an exploded view of the removable pipe and the fan assembly of the insect monitoring system in accordance with one or more non-limiting embodiments of the present technology.

Referring now to FIG. 8, there is shown an exploded view of the removable pipe 314 and the fan assembly 320 in accordance with one or more non-limiting embodiments of the present technology. The fan assembly 320 comprises a fan 322 disposed in a fan housing (not separately numbered), which is disposed between a top mounting base 326 and a bottom mounting base 328. As a non-limiting example, the top mounting base 326 and the fan housing may be made from aluminum, and the bottom mounting base 328 may be made stainless steel. The fan assembly 320 may be used to create air flows to suck up insects attracted by the set of LEDs 250 into the intake 240 and hold the insects against the ICN 340 for acquiring images of the insects using the camera subsystem 360. As a non-limiting example, the fan assembly 320 may enable creating airflows between 0 and 30 km/h.

Camera Subsystem

With reference to FIGS. 9A and 9B, the camera subsystem 360 will now be described. The camera subsystem 360 comprises a camera 362 which is configured to capture high resolution images of the ICN 340 which may include one or more insects. As a non-limiting example, the camera subsystem 360 may be configured to capture images having a resolution of 1,944 width and 1,944 height in pixels. The camera subsystem 360 comprises a power cable 364 connected to the camera 362 and an energy source (not depicted), a lens assembly 366, a cover glass 368 to prevent insects sticking on the lens assembly 366, a cover glass holder 372 which is removeable for periodical cleaning, a camera holder 374, a base 376 and a lighting array 378 comprising LEDs emitting white light to provide lighting for the camera 362 when the camera 362 is activated to capture images of insects held against the ICN 340. The camera 362 may have a wired or wireless connection to the electronics within the housing 12 or to another electronic device for transmission of images. As a non-limiting example, the cover glass holder 372, the camera holder 374, the base 376 may be made from aluminum.

Electronics Subsystem

Figure 10:
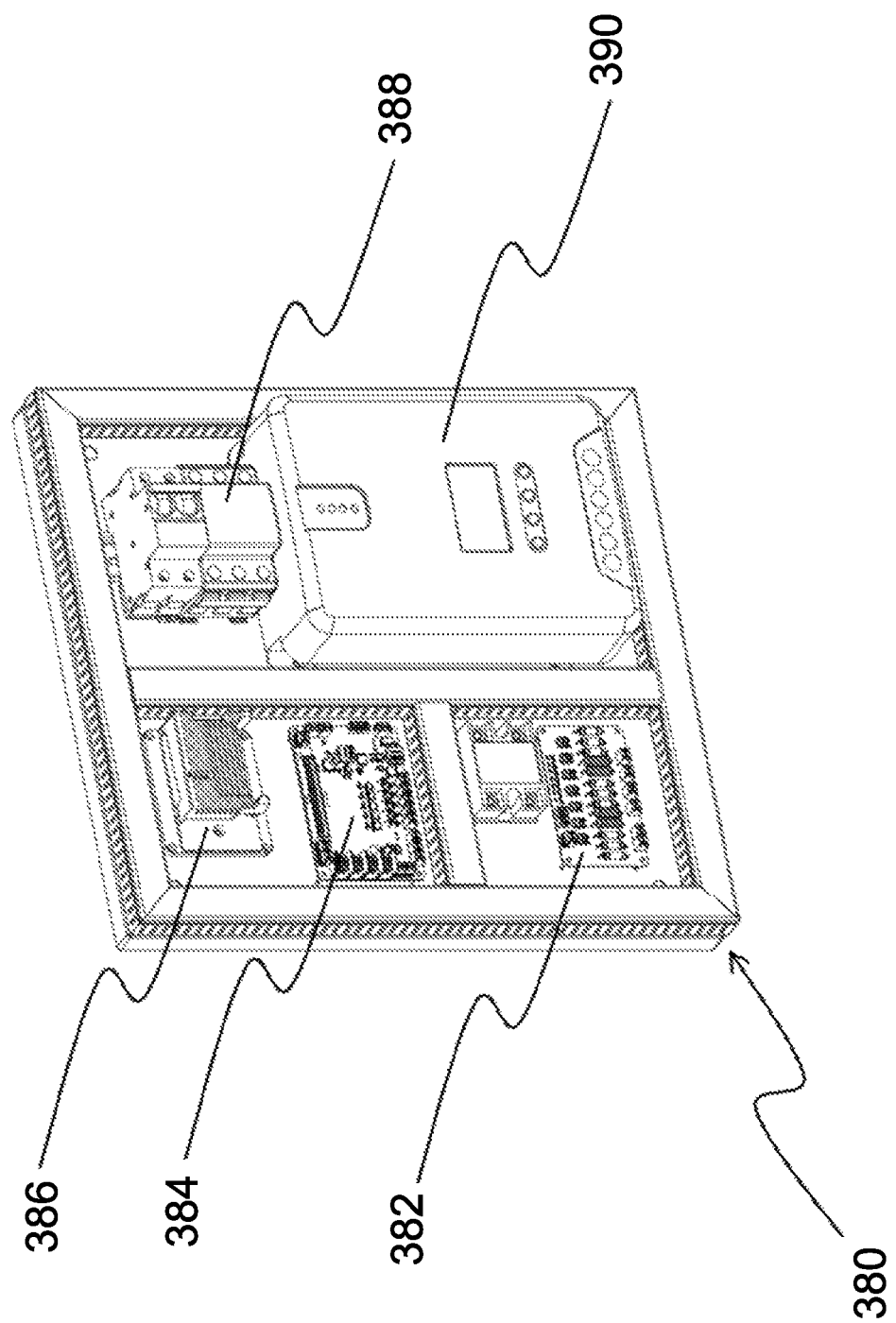
FIG. 10 provides a perspective view of the electronic subsystem of the insect monitoring system in accordance with one or more non-limiting embodiments of the present technology.
Figure 11:
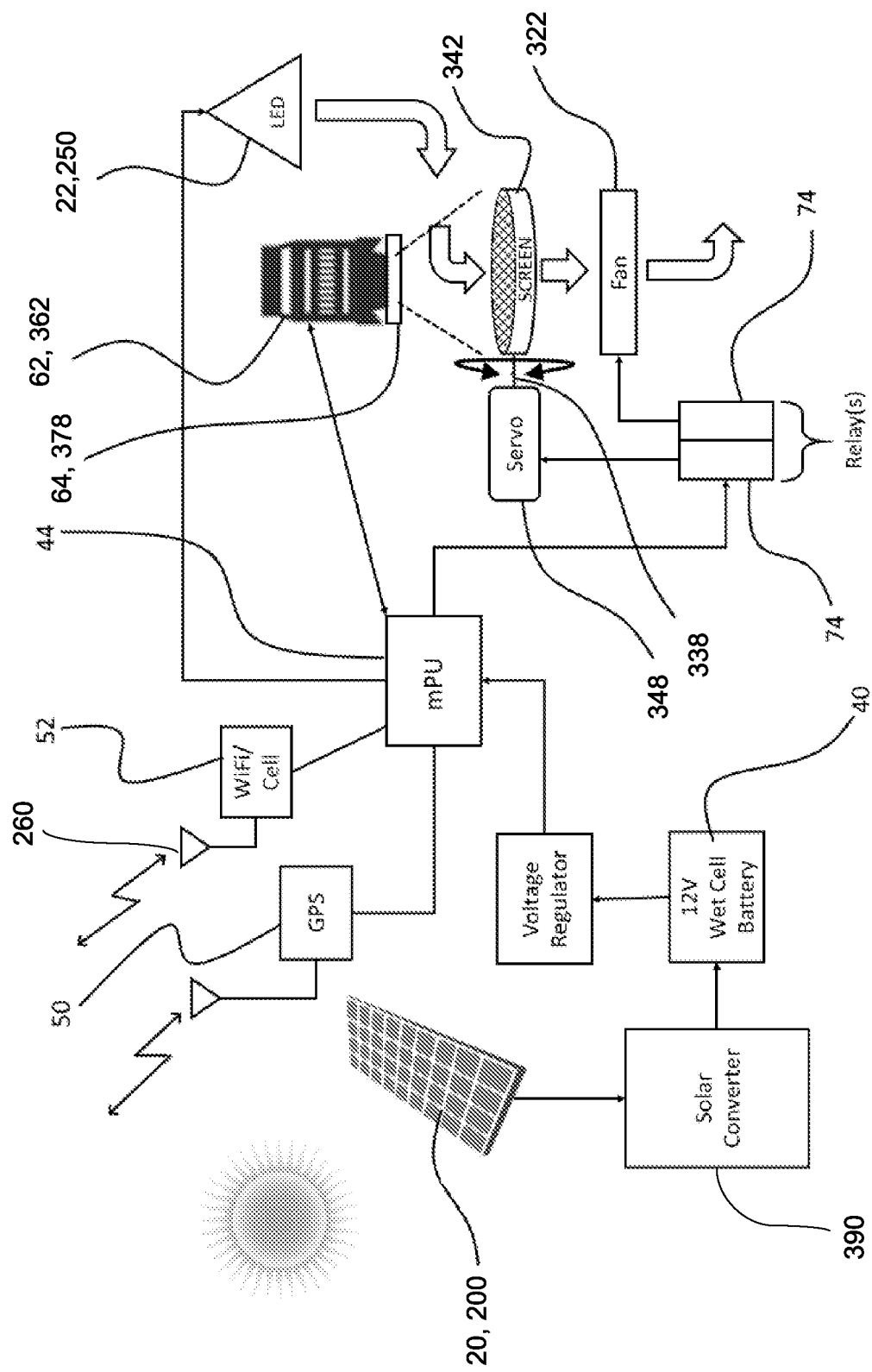
FIG. 11 provides a schematic diagram of an insect monitoring system in accordance with one or more non-limiting embodiments of the present technology.

With reference to FIG. 10 and to FIG. 11, an electronics subsystem 380 disposed at least in part within the housing 12, 120 will now be described in accordance with one or more non-limiting embodiments of the present technology.

The electronic subsystem 380 is similar to the electronics subsystem 42. The electronics subsystem 380 comprises a first power driver electronic circuitry 382 electrically connected to the insect luring lamp 22, 220 comprising the set of LEDs 250 for controlling the set of LEDs 250 to emit light.

The electronics subsystem 380 comprises a second power driver electronic circuitry 384 electrically connected to the fan 322 for activating and deactivating and controlling fan speed of the fan 322. The second power driver electronic circuitry 384 is electrically connected to the first and second servo motors 348, 356 for activating, deactivating, and controlling the rotation speed of the ICN 340 and the cleaning mechanism 358.

The electronics subsystem 380 comprises a main electronic circuitry 386 electrically connected to the other components of the insect monitoring system 10, 100 which includes camera subsystem 360, the GPS module 50, the network interface 52, the wind vane 192, the rain gauge sensor 194, components for reading the metrological parameters, reading the battery and solar status, a high voltage protector 388, and a solar electric charger 390.

Electricity generated by the solar panels 20, 200 and stored in the battery 40 via the solar electric charger 390 is used to power the controller 44, the camera 62, 362 and its associated lighting array 64, 378, the set of LEDs 250, the fan 70, 322 as well as the servo motors 348, 358 both which are operated under control of the controller 44, for example via an associated relay 74 or the like. Additionally, electricity stored in the battery 40 is used to power the GPS module 50 as well as the network interface 52 and networking device 260.

The controller 44 is an electronic device comprising a processing unit, a non-transitory storage medium operatively connected to the processing unit and input/output interfaces. The controller 44 is used to control one or more components of the insect monitoring system 10, 100 such as the camera 62, 362 and its associated lighting array 64, 378, the set of LEDs 250, the fan 70, 322 as well as the servo motors 348, 358, the camera subsystem 360, the GPS module 50, the network interface 52, the wind vane 192, the rain gauge sensor 194, and the like. The controller 44 may activate and deactivate as well as control parameters of the components. In one or more embodiments, the controller 44 is implemented as a microcontroller. In one or more other embodiments, the controller 44 is implemented as a system on a chip (SoC).

It is contemplated that the controller 44 may be implemented as one or more of various processing means such as a microprocessor, a controller, a digital signal processor (DSP), a processing device with or without an accompanying DSP, or various other processing devices including integrated circuits such as an ASIC (application specific integrated circuit), an FPGA (field programmable gate array), a microcontroller unit (MCU), a hardware accelerator, a special-purpose computer chip, processing circuitry, or the like.

The controller 44 is configured to operate the insect monitoring system 10, 100 in one or more modes including an insect attraction mode and a stand-by mode, which will be described in more detail herein below.

Insect Monitoring Communication System

Figure 12:
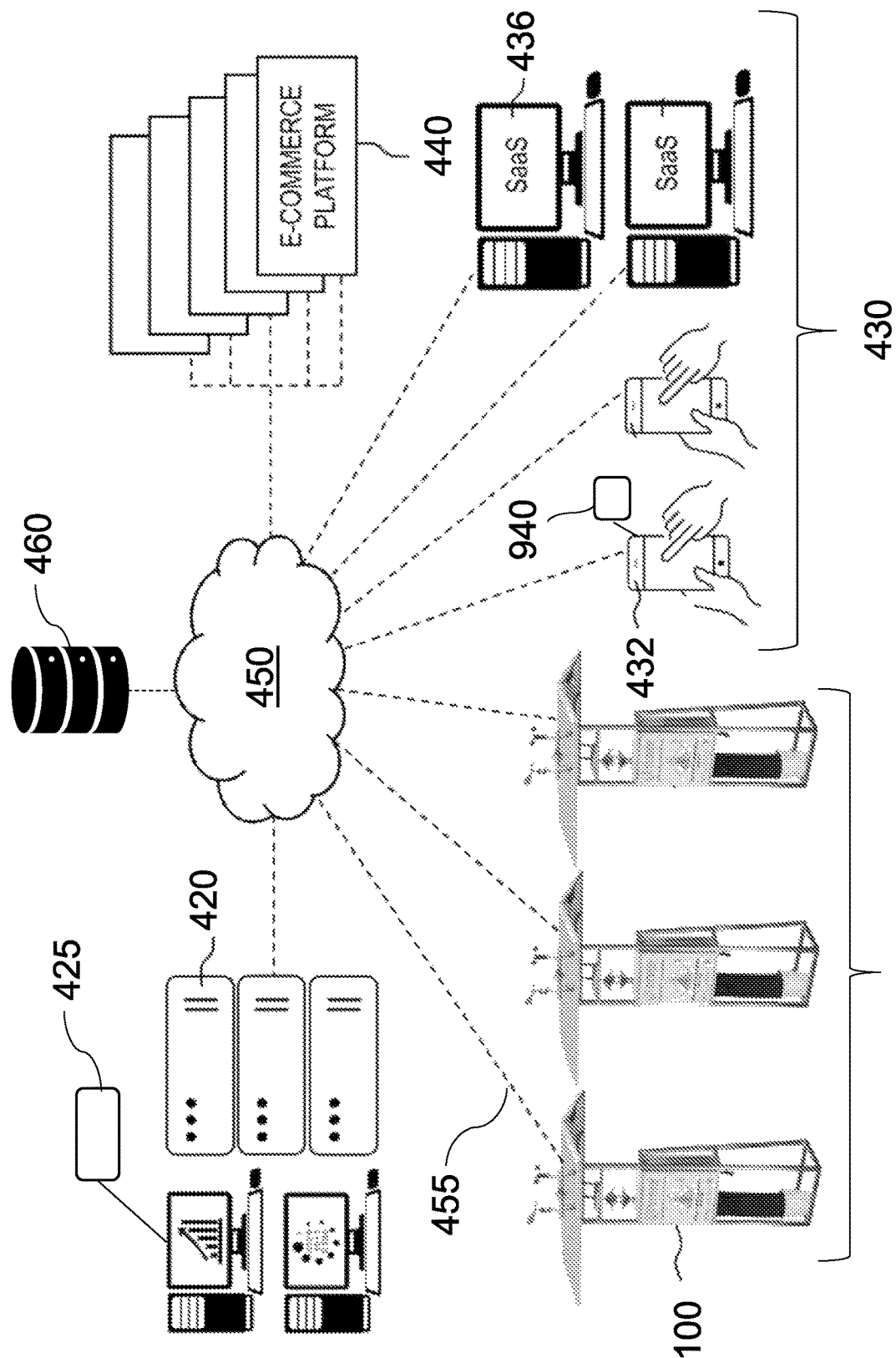
FIG. 12 provides a schematic diagram of an insect monitoring communication system in accordance with one or more non-limiting embodiments of the present technology.

Now referring to FIG. 12, there is shown a schematic diagram of an insect monitoring communication system 400, the insect monitoring communication system 400 being suitable for implementing one or more non-limiting embodiments of the present technology.

The insect monitoring communication system 400 comprises inter alia one or more servers 420, a database 460, a plurality of insect monitoring systems 410, a plurality of client devices 430, and an e-commerce platform 440 communicatively coupled over a communications network 450 via respective communication links 455.

Insect Monitoring Systems

The plurality of insect monitoring systems 410 comprises one or more insect monitoring systems such as the insect monitoring systems 10, 100 (only one numbered in FIG. 12) located at different geographical locations, for example within a field, different fields, city, region and the like. The plurality of insect monitoring systems 410 may be operated by a single entity or by more than one entity.

Each of the plurality of insect monitoring systems 410 is coupled to the communications network 450 for receiving and transmitting data. The type of data transmitted between components of the communication network 450 is not limited and may include any type of digital data. In one or more embodiments, the plurality of insect monitoring systems 410 are coupled to the communication network 450 via the network interface 52 and networking device 260.

At least a portion of the parameters of the plurality of insect monitoring system 410 may be accessible to one or more devices connected to the communications network 450.

Server

The server 420 is configured to: (i) exchange data with one or more of the plurality of insect monitoring systems 410, the plurality of client devices 430, and the e-commerce platform 440; (ii) analyze data exchanged between the plurality of insect monitoring systems 410, the plurality of client devices 430, and the e-commerce platform 440; (iii) access a set of machine learning algorithms (MLAs) 425; (iv) train the set of MLAs 425 to perform insect recognition in images; and (v) perform insect recognition using the set of MLAs 425.

How the server 420 is configured to do so will be explained in more detail herein below.

It will be appreciated that the server 420 can be implemented as a conventional computer server. The server 420 comprises inter alia a processing unit operatively connected to a non-transitory storage medium and one or more input/output devices. In a non-limiting example of one or more embodiments of the present technology, the server 420 is implemented as a server running an operating system (OS). Needless to say the server 420 may be implemented in any suitable hardware and/or software and/or firmware or a combination thereof. In the disclosed non-limiting embodiment of present technology, the server 420 is a single server. In one or more alternative non-limiting embodiments of the present technology, the functionality of the server 420 may be distributed and may be implemented via multiple servers (not shown).

The implementation of the server 420 is well known to the person skilled in the art. However, the server 420 comprises a communication interface (not shown) configured to communicate with various entities (such as the database 460, for example and other devices potentially coupled to the communication network 450) via the network. The server 420 further comprises at least one computer processing unit operationally connected with the communication interface and structured and configured to execute various processes to be described herein.

Machine Learning Algorithm (MLA)

The server 420 has access the set of MLAs 425 which includes one or more machine learning algorithms (MLAs).

Once trained, the set of MLAs 425 is configured to inter alia: (i) receive an image captured by the camera 62, 362; (ii) recognize insects in the image captured by the camera 62, 362.

Insect recognition may include insect detection and insect segmentation. To achieve that objective, the set of MLAs 425 undergoes a training routine to obtain a set of trained MLAs, which will be explained in more detail herein below.

In one or more embodiments, the server 420 may execute the set of MLAs 425. In one or more alternative embodiments, the set of MLAs 425 may be executed by another server (not depicted), and the server 420 may access the set of MLAs 425 for training or for use by connecting to the server (not shown) via an API (not depicted), and specify parameters of the set of MLAs 425, transmit data to and/or receive data from the set of MLAs 425, without directly executing the set of MLAs 425.

As a non-limiting example, one or more MLAs of the set of MLAs 245 may be hosted on a cloud service providing a machine learning API.

It will be appreciated that the functionality of the server 420 may be executed by other electronic devices such as one or more of the plurality of client devices 430 and the plurality of insect monitoring systems 410.

Database

A database 460 is communicatively coupled to the server 420 via the communications network 450 but, in one or more alternative implementations, the database 460 may be communicatively coupled to the server 420 without departing from the teachings of the present technology. Although the database 460 is illustrated schematically herein as a single entity, it will be appreciated that the database 460 may be configured in a distributed manner, for example, the database 460 may have different components, each component being configured for a particular kind of retrieval therefrom or storage therein.

The database 460 may be a structured collection of data, irrespective of its particular structure or the computer hardware on which data is stored, implemented or otherwise rendered available for use. The database 460 may reside on the same hardware as a process that stores or makes use of the information stored in the database 460 or it may reside on separate hardware, such as on the server 420. The database 460 may receive data from the server 420 for storage thereof and may provide stored data to the server 420 for use thereof.

In one or more embodiments of the present technology, the database 460 is configured to inter alia: (i) store information relative to the plurality of insect monitoring systems 410; (ii) store data relative to users of the plurality of client devices 430 (iii) store images captured by the plurality of insect monitoring systems 410; and (iv) store parameters of the set of MLAs Client Devices The insect monitoring communication system 400 comprises the plurality of client devices 430 associated respectively with a plurality of users (not depicted). The plurality of client devices 430 comprises a first client device 432 associated with a first user (not depicted) which is implemented as a smartphone, and a second client device 436 which is associated with a second user (not depicted) is implemented as a desktop computer. It will be appreciated that each of the plurality of client device 430 may be implemented as a different type of electronic device, such as but not limited to desktops, laptops, netbooks, etc.), smartphones, and tablets, as well as network equipment such as routers, switches, and gateways. The number of the plurality of client devices 430 is not limited.

In one or more embodiments, each of the plurality of client devices 430 has access to an application 940, which as a non-limiting example may be standalone software or accessible via a browser. The application 940 may enable a user associated with one of the plurality of client devices 430, such as the first user associated with the first client device 432 and the second user associated with the second client device 436, to access parameters of the plurality of insect monitoring systems 410. It will be appreciated that different users may have different privileges and access to different options of the insect monitoring systems 10, 100.

In one or more embodiments, the application 940 provides weather data, insect data (identification and counts), natural enemy to the insects data (identification and counts), photographs of the insect and natural enemy counts, the data progression over time with hourly data for each installation of the network of insect monitoring stations 100 along with their geographical location on a map. The application 940 also provides advertising space for product placement. The application 940 also provides advice and tutorial means for insect control and provides instant communication means to delegated staff that may answer questions from users.

One or more embodiments of the application 940 will be described in more detail herein below.

E-Commerce Platform

In one or more embodiments, the insect monitoring communication system 400 comprises an e-commerce platform 440.

The e-commerce platform 440 may be hosted on the server 420 or on another server (not depicted). The e-commerce platform 440 may be a website and/or a stand-alone software accessible by users via the plurality of client devices 430. In one or more embodiments, the e-commerce platform 440 is accessible in the application 940.

The e-commerce platform 440 provides commercial products such as various pesticides for delivery to operators of the plurality of insect monitoring systems 410. In one or more embodiments, once insects have been recognized by the set of MLAs 425, the list of recognized insects may be transmitted to the e-commerce platform 440 which may analyze the list and provide recommendations of products such as insecticides based on the recognized insects in the list. The products may be recommended to the user for eliminating the specific insects identified near each of the plurality of plurality of insect monitoring system 410. In one or more embodiments, each product may include a product type, a product quantity, and a product price. As a non-limiting example, the product recommendations may include an insecticide type, an insecticide quantity, and an associated price. The recommendations may be sorted according to different factors such as relevance for the type of insects, efficiency, price, and transmitted for display on a device.

In one or more embodiments, the analysis of the recognized insects may be performed locally by the server 430 or the plurality of client devices before being transmitted to the e-commerce platform 440.

The e-commerce platform 440 provides an interface which enables to access based on insect and natural enemy data, product recommendations such as insecticides, fertilizers, replacement parts and agricultural equipment, with pricing and delivery means for their users. In some aspects the e-commerce platform can also be used to sell products and services unrelated to the insect data.

Communication Network

In one or more embodiments of the present technology, the communications network 450 is the Internet. In one or more alternative non-limiting embodiments, the communication network 450 may be implemented as any suitable local area network (LAN), wide area network (WAN), a private communication network or the like. It will be appreciated that implementations for the communication network 450 are for illustration purposes only. How a communication link 455 (not separately numbered) between the one or more servers 420, the plurality of insect monitoring systems 410, the plurality of client devices 430, and the e-commerce platform 440 and/or another electronic device (not shown) and the communications network 450 is implemented will depend inter alia on how each electronic device is implemented.

Operation of the Insect Monitoring System

With reference to FIG. 1 to FIG. 13, operation of the insect monitoring system 10, 100 will now be described in accordance with one or more non-limiting embodiments of the present technology.

The insect monitoring system 10, 100 is configured to operate in one or more modes, including an insect attraction mode and a stand-by mode. In one or more embodiments, the insect monitoring system 10, 100 is controlled via the controller 44 and/or another processing device connected to components of the insect monitoring system 10, 100 so as to operate in the insect attraction mode and the stand-by mode.

In one or more alternative embodiments, at least a portion of the components in the insect monitoring system 10, 100 may have communication modules and may be controlled independently and/or remotely via the communication network 450, as a non-limiting example by the server 420 and/or the plurality of client devices 410.

In one or more embodiments, components of the insect monitoring system 10, 100 may have been preprogrammed according to a schedule or different factors to operate in the insect attraction mode and the stand-by mode.

In one or more embodiments, the insect monitoring system 10, 100 may be operated in the insect attraction mode in response to a power threshold, i.e. only if there is enough energy stored in the battery 40 to enable operation of the components of the insect monitoring system 10, 100. The insect monitoring system 10, 100 may operate according to a predetermined schedule which may be based on time, weather, and the like.

As a non-limiting example, the insect monitoring system 10, 100 may operate in the insect attraction mode in response to the solar voltage being below 0.5 V, which indicates that there is less sunlight and thus more insect activity.

When operating in the insect attraction mode, the set of LEDs 250 in the insect luring lamp 22, 220 are activated to attract various types of insects. In this regard, one or more LEDs of the set of LEDs 250 may emit light in a variety of different wavelengths, including blue light, green light and UV light. In one or more embodiments, the one or more LEDs 250 may emit in a wavelength range between 350 and 650 nm. It will be appreciated that the spectrum emitted by each of the set of LEDs 250 may be chosen according to different factors such as types of insects to attract and the like.

In the insect attraction mode, the fan 322 is activated and controlled to create an airflow such that insects (not shown) attracted by the set of LEDs 250 are drawn into the insect capture and release subsystem 300 via the conical intake 24, 240 and held against the ICN 340. As a non-limiting example, the airflow generated by the fan assembly 320 may draw the insects into the intake 240, the first pipe 310 and the second pipe 312 such that the insects end up in the ICN assembly 330 and are held substantially immobile against the ICN 340. In the insect attraction mode, the servo motor 348 may be controlled to cause rotation of the ICN 340 to remove insects from the ICN 340.

The ICN 340 is arranged within the optical path of the camera 62, 362 and is sized such that insects 516 may not pass through but rather are held substantially immobile against the ICN 671 by the air flow generated by the fan 322.

In the insect attraction mode, the camera 62, 362 and the lighting array 64, 378 are activated such that the ICN 340 is illuminated by the lighting array 64, 378, and the camera 62, 362 acquires or captures images of insects held against the ICN 340. In one or more embodiments, the camera 62, 362 may be activated to acquire images according to a predetermined schedule once the set of LEDs 250 and the fan 322 is activated. As a non-limiting example, the camera 62, 362 may capture images of the ICN 340 every 30 minutes.

In the insect attraction mode, once an image 512 has been captured, the servo motor 348 is activated to cause and control rotation of the ICN 340 such that the insects 516 held against the ICN 340 may be released via the exhaust 60. As a non-limiting example, the ICN 340 may be rotated at 180 or 360 degrees at a given speed to enable insects to be released via the exhaust 60.

In one or more embodiments where the ICN assembly 330 comprises the cleaning mechanism 358 and the second servo motor 356, the second servo motor 356 may be activated for moving the cleaning blades of the cleaning mechanism 358 to remove insects from at least a portion of the ICN assembly 330.

Figure 13:
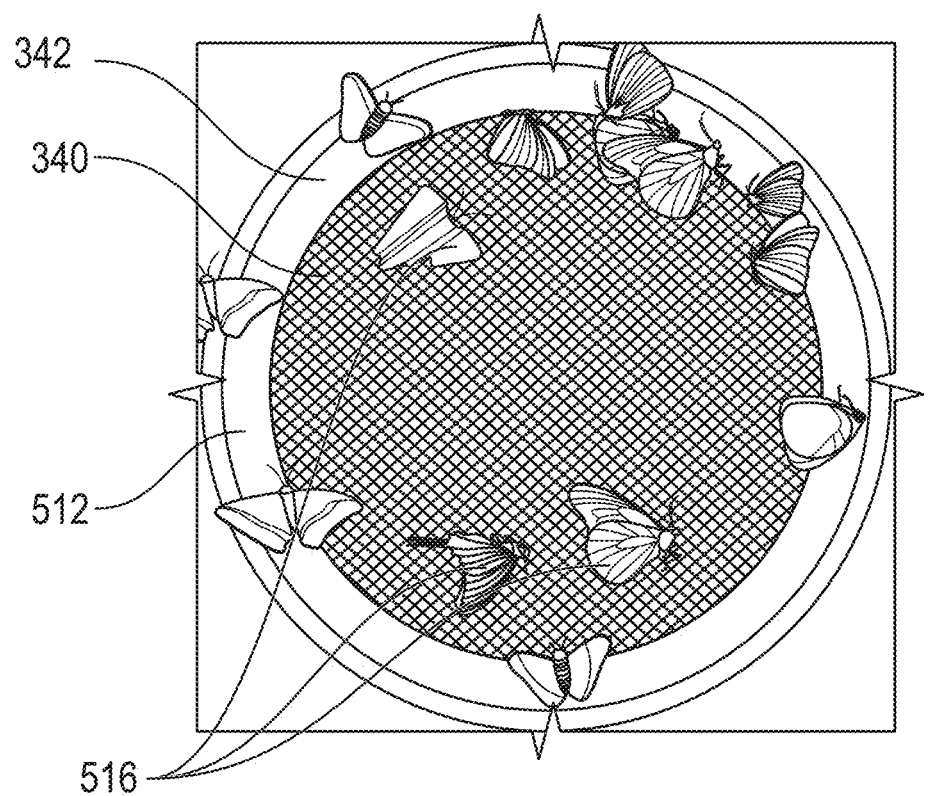
FIG. 13 provides a top plan view of an image captured by an insect monitoring system in accordance with one or more non-limiting embodiments of the present technology.

In one or more embodiments and with reference to FIG. 13, the servo motors 348, 358 may be operated according to a predetermined time schedule, as a non-limiting example once every hour, and such that the captured image 512 comprises insects 516 held against the ICN 340 during that time period. In one or more embodiments, the schedule is chosen such that the density of insects in a given captured image 512 is less than 50% as this improves their recognition, however this does not need to be so in every embodiment of the present technology. When insects 516 are particularly active at night the schedule may be adjusted to capture an increased number of images between dusk and dawn. Alternatively, in a given embodiment the schedule may be adjusted automatically and from time to time to ensure that the density of insects 516 in a given captured image 512 remains below 50%.

The captured image 512 may then be stored in a non-transitory storage medium and/or transmitted to a processor having access to the set of MLAs 425 for recognizing insects. In one or more embodiments, the captured images may be stored in a non-transitory storage medium and/or transmitted to a processor for training the set of MLAs 425.

In the stand-by mode, the set of LEDs 330, the fan 322, the camera 62, 362 and the lighting array 64, 378 are deactivated. In one or more embodiments, when starting operation in the stand-by mode, the servo motor 348, 356 may be activated to release as much insects as possible from the insect monitoring system 10, 100.

When operating in the stand-by mode, which may be as a non-limiting example during daytime, the solar panels 20, 200 may receive sunlight which may be converted into electrical power using the solar electric charger 390 which may be stored and used for operating components of the insect monitoring system 10, 100.

It will be appreciated that other functionalities of the insect monitoring system 10, 100 such as the communication interfaces, the weather devices including the wind vane 192, the rain gauge sensor 194, and the anemometer 196 may continuously function in the insect attraction mode and/or the stand-by mode.

Insect Recognition Machine Learning Algorithm

Figure 14:
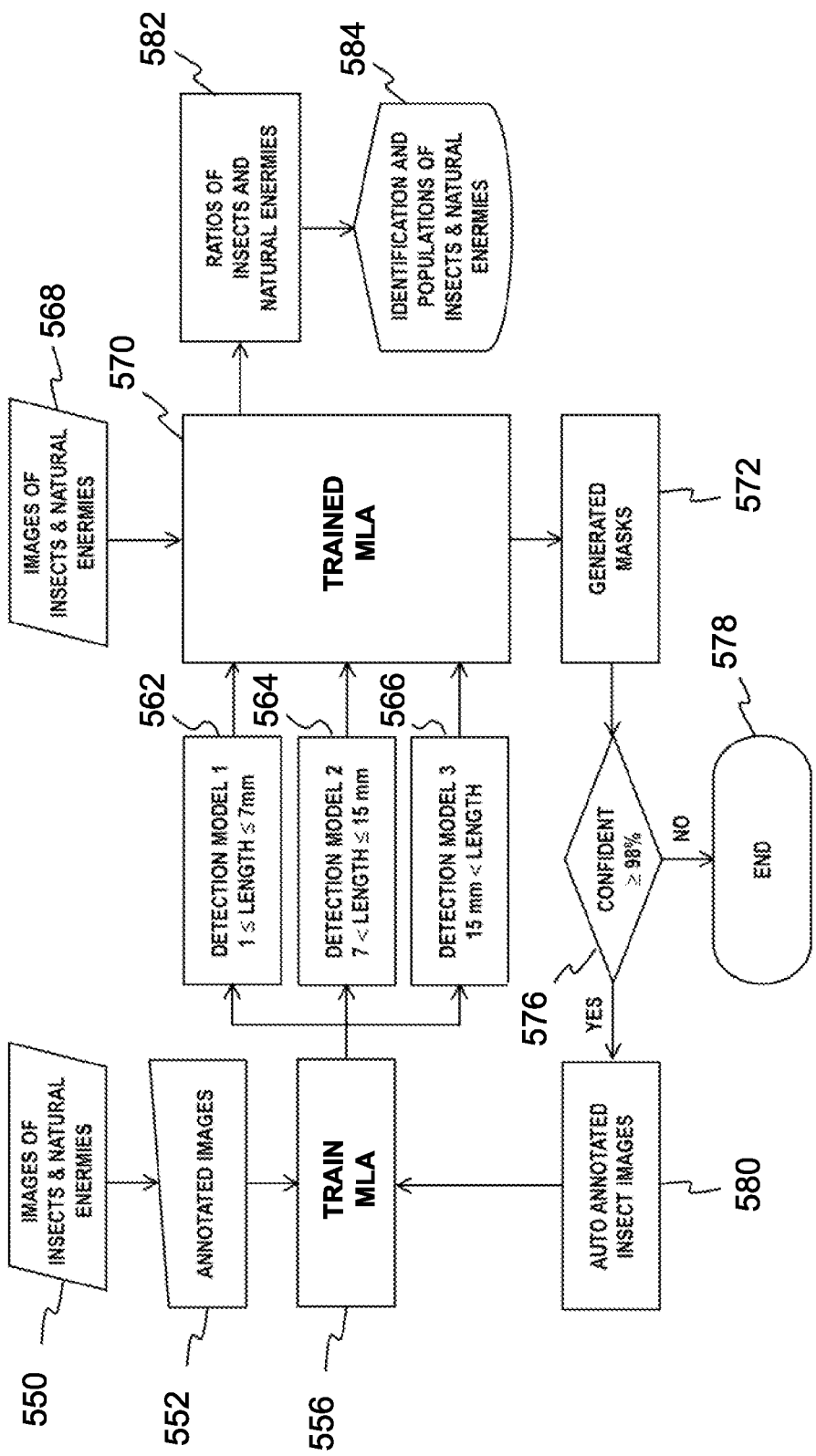
FIG. 14 provides an insect recognition routine of the insect monitoring system in accordance with one or more non-limiting embodiments of the present technology.

With reference to FIG. 14, an insect recognition routine 500 will be described in accordance with one or more non-limiting embodiments of the present technology.

The insect recognition routine 500 trains the set of MLAs 425 to recognize insects and uses the set of trained MLAs 570 to recognize insects.

In one or more embodiments, the image capture frequency of the camera 62, 362 is determined based on the insect density on the ICN 340. The camera 62, 362 may be configured to capture one or more images of the mesh so as to obtain images including different numbers and different types of insects for training the set of MLAs 425 to recognize insects. It will be appreciated that the plurality of images may be captured based on a specific schedule, a specific LED light wavelength, and the like.

In one or more embodiments, once the camera 62, 362 has captured a plurality of images 550, the plurality of images 550 may be provided to assessors for annotation. As a non-limiting example, the plurality of images 550 may be transmitted over the communication network 450 to one or more of the plurality of client devices 430 associated with respective users for annotation thereof. It will be appreciated that the users performing the annotation may not necessarily be operators or owners of the insect monitoring system 10, 100.

Figure 15A:
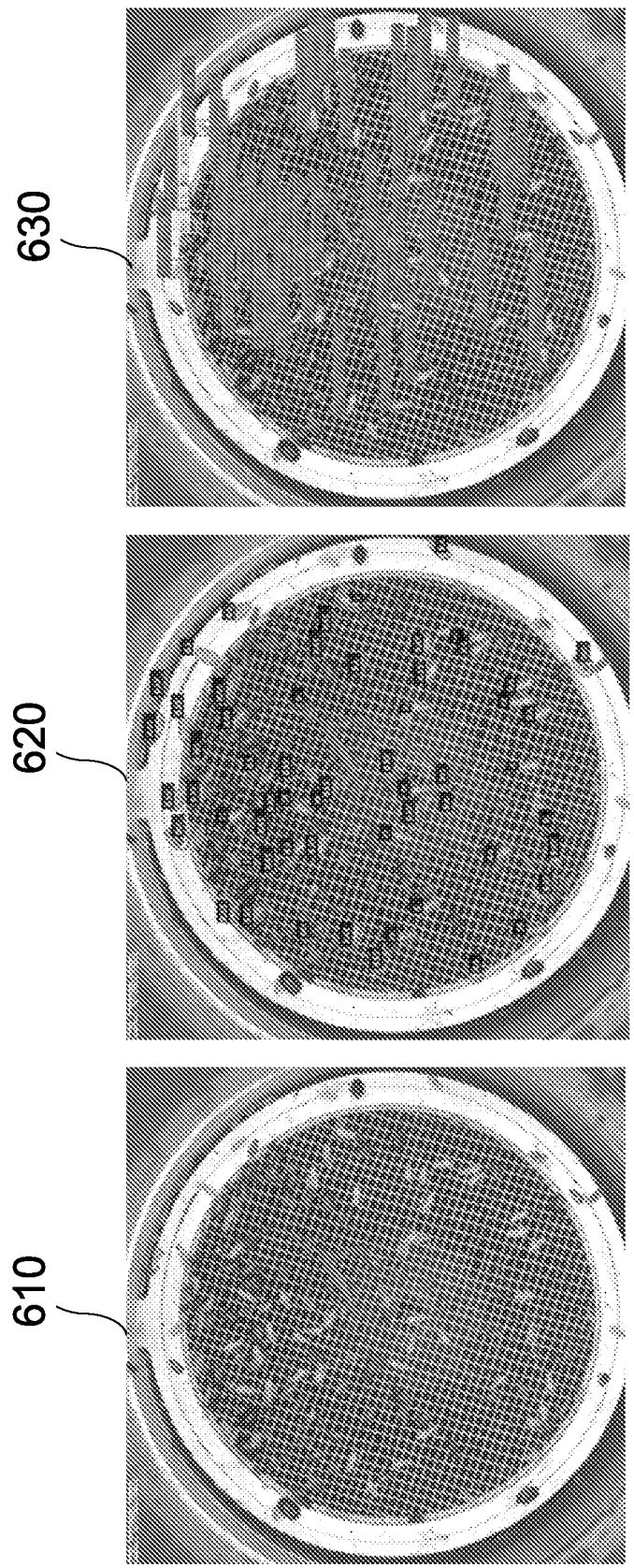
FIG. 15A to 15C provide respective images captured by the insect monitoring system, annotated images and recognized images by the set of trained MLAs 570 in accordance with one or more non-limiting embodiments of the present technology.
Figure 15B:
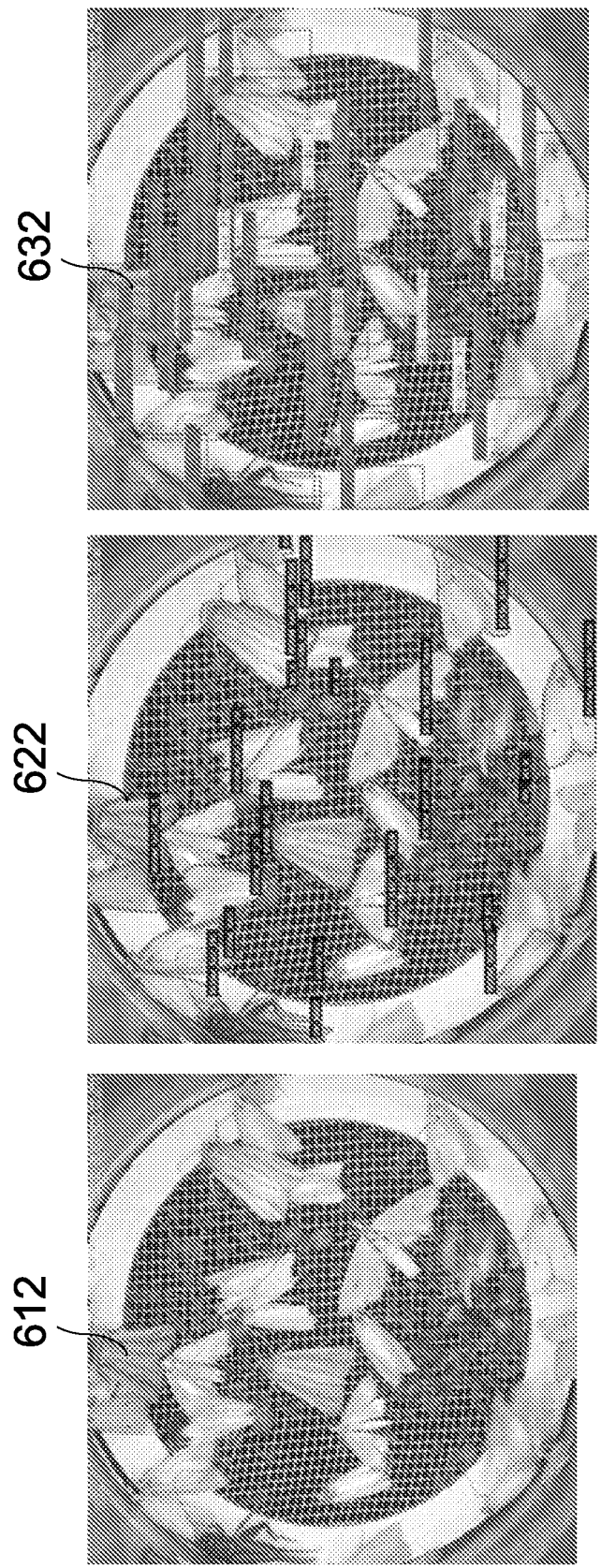
Figure 15C:
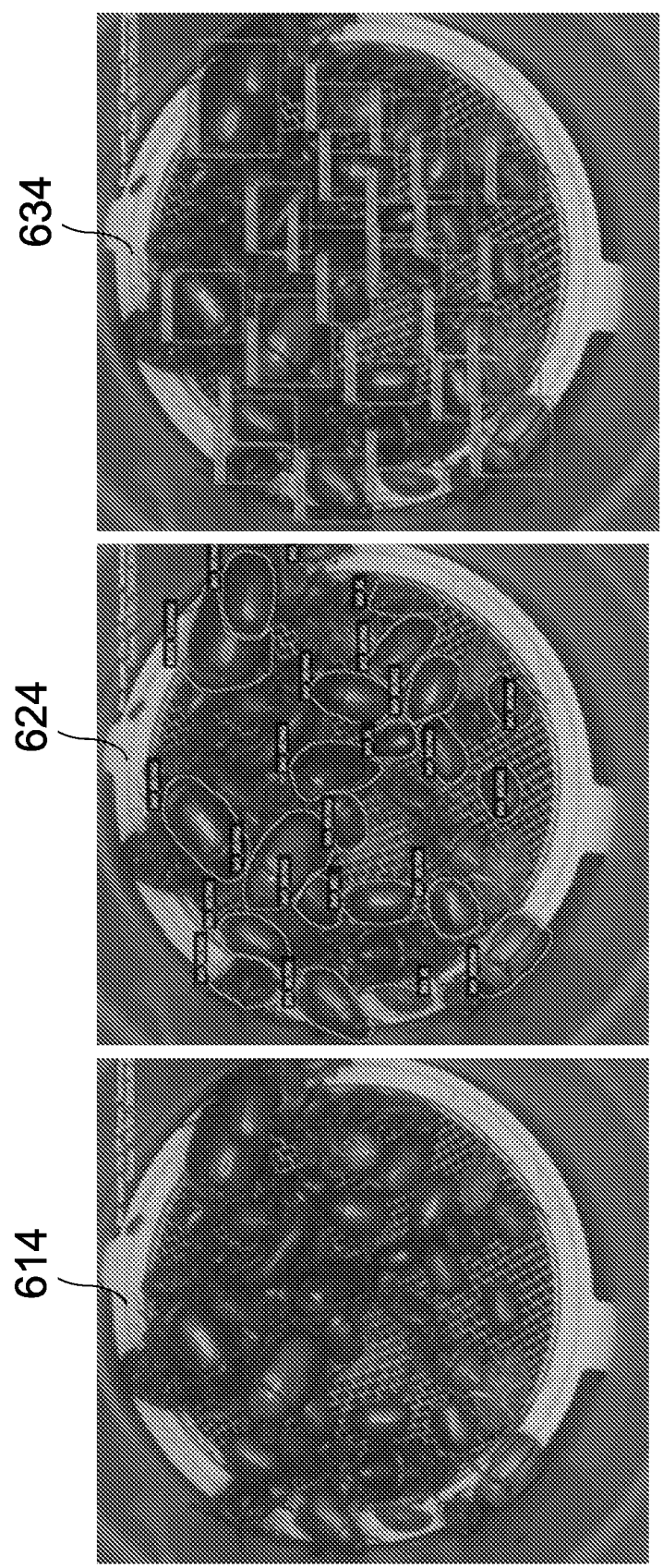

With brief reference to FIGS. 15A to 15C, non-limiting examples of captured images 610, 612, 614 are illustrated.

Turning back to FIG. 14, the assessors may annotate or label the plurality of images 550 on their respective devices of the plurality of client devices 430 so as to generate a plurality of annotated images 552 which are divided into one or more training datasets for training one or more MLAs of the set of MLAs 425. As a non-limiting example, the plurality of images 550 may be represented in portable network graphics (PNG) file formats with 1,944 pixels width and 1,944 pixels height. As a non-limiting example, the plurality of annotated images 552 may be annotated using the VGG Image Annotation software (VIA 1.0.6), which is available from Visual Geometry Group, Department of Engineering, University of Oxford.

In one or more embodiments, the assessors may annotate each of the plurality of images by assigning, to each insect in an image, an insect label, and an approximate mask of the insect. The insect label specifies the type or name of the insect (or any label enabling to identify the insect), and the mask of the insect specifies which pixels in the image belong to that insect, i.e., a label for each pixel in the image belonging to the insects. The images may be annotated with additional information which may help train the one or more MLAs for insect recognition. As a non-limiting example, data relative to the environmental conditions, metadata and other factors which may influence presence of insects may be included in the annotated data.

In one or more alternative embodiments, the assessors may annotate each of the plurality of images by assigning, to each insect in an image, an insect label and a bounding box. The insect label specifies the type or name of the insect, and the bounding box indicates the location and an approximate scale of the insect in the image. As a non-limiting example, the bounding box may have a shape such as a circle, a square, and a rectangle.

With brief reference to FIGS. 15A to 15C, non-limiting examples of annotated images 620, 622, 624 are illustrated.

Turning back to FIG. 14, the insects in the plurality of annotated images 552 may be identified according to one or more of their names, subfamily, family, superfamily, infraorder, order, and the like. In one or more embodiments, each insect may be further associated with an indication of its natural enemy, which may enable determining the presence of natural enemies of each recognized insect, as well as other data.

Table 1 details a non-limiting example of insects and natural enemies according to their sizes:

| INSECTS AND NATURAL ENEMIES (NE) | LENGTH OF INSECTS |
|---|---|
| Chironomidae (NE), *Cylas formicarius*, *Cyrtorhinus lividipennis* (NE), *Idioscopus* spp., *Nephotettic* sp., *Nilaparvata lugens*, *Mesomorphus villiger*, *Pachydiplosis oryzae*, *Recilia dorsalis*, *Sogatella furcifera* and others. | 1 < Length ≤ 7 mm |
| Aster Leaf Hopper, *Aulacophora similis*, *Brontispa longissima*, *Macrocentrus philippinensis* (NE), *Micraspis* sp. (NE); *Heteroneda reticulata* (NE), *Ophionea indica* (NE), *Paederus fuscipes* (NE), *Pipunculus mutillatus* (NE), *Plutella xylostella*, Sarcophagidae, Syrphidae (NE), Tephritidae, *Triatoma rubrofasciata* and others. | 7 ≤ Length ≤ 15 mm |
| *Adoretus sinicus*, *Agrius convolvuli*, Alates, *Allissonotum Inpressicola*, Anisoptera (NE), Apidae (NE), *Argina astrea*, *Asota kageri*, *Blattella germanica*, *Cicindela punctulata* (NE), *Chlaenius festivus* (NE), *Cnaphalocrosis medinalis*, *Creatonotos gangis*, *Darapsa myron*, *Diaphania indica*, Gryllidae, Gryllotalpidae, *Hypercompe permaculata*, *Leptocorisa oratorius*; *Nezara viridula*, *Lethocerus indicus*, *Oxya* spp., *Oryctes rhinoceros* L., *Parasa lepida*, *Parnara guttata* Bremer et Grey, *Plodia interpuncella*, *Riptortus* spp., *Schistocerca americana*, *Scotinophora lurida*, *Scirpophaga incertulas*, *Sesamia inferens*, *Spodoptera frugiperda*, *Syntomoides amata*, *Temelucha basiornata*, Tettigoniida (NE), *Xylophanes tersa*, *Xystrocera globosa*, *Utetheisa pulchella* and others. | 15 mm ≤ Length |

In one or more embodiments, the plurality of annotated images 552 may be divided into one or more training datasets according to different factors. In one or more embodiments, the plurality of annotated images is divided based on one or more of a size of the insects present in each image, and a density of insects present in each image. It will be appreciated that the approximate size and density of the insects may be evaluated by the assessors, by a machine learning algorithm or using software routines.

It is contemplated that the plurality of images 550 may be at least partially annotated in a different manner to obtain the plurality of annotated images 552, as a non-limiting example by using other machine learning models.

Once each of the plurality of images 550 is annotated, the annotated images are transmitted and/or aggregated to form the plurality of annotated images 552.

The plurality of annotated images 552 are received by the server 420. In one or more alternative embodiments, the plurality of annotated images 552 are received by another electronic device (not shown) comprising inter alia a processor connected to a non-transitory storage medium. As a non-limiting example, the electronic device may be included in the insect monitoring system 10, 100.

In one or more embodiments, the plurality of annotated images 552 may be divided into a first training dataset which includes images of the insects having a length between one and seven millimeters, a second training dataset which includes images of insects having a length between seven and fifteen millimeters, and third training dataset which includes images of insects having a length above fifteen millimeters. It will be appreciated that a respective validation dataset and a respective testing dataset may be obtained from the plurality of annotated images for each of the first training dataset, the second training dataset, and the third training dataset.

It will be appreciated that the plurality of annotated images 552 may be divided into more or less datasets according to other factors without departing from the scope of the present technology.

The server 420 executes a training routine 556 of the set of MLAs 425.

The server 420 is configured to: (i) access one or more machine learning algorithms (MLAs) of the set of MLAs 425; (ii) receive the plurality of annotated images 552; (iii) train the one or more MLAs on the plurality of annotated images 552 to perform insect recognition; and (iii) output one or more trained machine learning models 562, 564, 566 for use by the insect monitoring system 10, 100.

The server 420 executes one or more machine learning algorithms which will be used to perform insect recognition in images captured by the camera 62, 362.

The server 420 accesses the set of MLAs 425. In one or more embodiments, the set of MLAs 425 comprises a neural network and/or a deep neural network. In one or more embodiments, the set of MLAs 425 comprises a convolutional neural network (CNN).

The server 420 trains the set of MLAs 425 to perform insect recognition on the plurality of annotated images 552. Insect recognition may include one or more of insect detection, and insect semantic segmentation.

When performing insect detection, a given MLA of the set of MLAs 425 may locate presence of insects in an image and types of the located insects, i.e. the given MLA may receive as an input an image of the ICN 340, and output, for each detected insect in the image, one or more bounding boxes in the image and a respective class label. The one or more MLAs 425 may also output a confidence score for each insect in an image, which is indicative of a probability of the insect belonging to the class.

When performing semantic segmentation, also known as object segmentation or instance segmentation, the given MLA of the set of MLAs 425 may locate and delimit insects in an image and the types of the insects, i.e. the given MLA of the set of MLAs 425 may receive as an input an image of the ICN 340 and may output the specific pixels in the image which belong to an insect and a respective class label or type of the insect. The type of insects to be recognized may be those which are common pests to a certain type of crop being cultivated in the vicinity of the insect monitoring system 10, 100 and insects which pray on insects which are pests to a certain type of crop. The given MLA of the set of MLAs 425 may also output a confidence score for each insect in an image, which is indicative of a probability of the insect belonging to the class.

It will be appreciated that other information may also be output by the given MLA of the set of MLAs 425 or by invoking a software routine, such as the number of insects in a given image, the ratio of insects to natural enemies and the like.

In one or more embodiments, the given MLA of the set of MLAs 425 comprises a region proposal network (RPN) where regions may be generated and similarity of pixels or groups of pixels in a region may be evaluated based on brightness features, color features, texture features and the like. In one or more embodiments. As a non-limiting example, the RPN uses one or more of: histograms of oriented gradients (HOG), bag-of-words, scale invariant feature transform (SIFT) descriptors, and the like as features for determining regions and for segmentation thereof. The given MLA of the set of MLAs 425 may further extract features using regions of interest pooling (RoIPool) from each candidate box and perform classification and bounding-box regression, and output a binary mask for each region of interest (RoI). As a non-limiting example, a given MLA of the set of MLAs 425 may be implemented as Mask R-CNN. As another non-limiting example, a given MLA of the set of MLAs 425 may be implemented as Faster R-CNN.

The server 420 is configured to initialize parameters of set of MLAs 425, which include model parameters and hyperparameters. The model parameters and hyperparameters depend on the type of MLA in the set of MLAs 425.

The server 420 then performs a training routine to train the given MLA of the set of MLAs 425 on the plurality of annotated images 552. During the training routine, the set of MLAs 425 are configured to receive as an input a given annotated image (without its respective annotations), extract image features therefrom, and generate a predicted class and a predicted mask for the given annotated image. The predicted class and predicted mask are then compared to the annotated class and mask as a non-limiting example using one or more loss functions. Parameters of the one or more MLAs 425 are then updated based on the calculated loss using techniques known in the art, such as, but not limited to gradient descent, back propagation and the like.

The set of MLAs 425 are trained the plurality of annotated images 552 iteratively until convergence.

After the training routine, the set of MLAs 425 are subject to a validation procedure on a validation dataset and a testing procedure on a testing dataset. The validation procedure provides an unbiased evaluation of the model fit on the training dataset while tuning the model's hyperparameters. The testing procedure provides an unbiased evaluation of the final model fit on the training dataset.

In one or more embodiments, the training is performed on the first training set, the second training set and the third training set to obtain respectively a first MLA model 562, a second MLA model 564, and a third MLA model 566 for respectively recognizing insects of sizes between 1 and 7 mm, between 8 and 15 mm, and longer than 15 mm. The first MLA model 562, the second MLA model 564, and the third MLA model 566 are part of a set of trained MLAs 570.

The server 420 then outputs the set of trained MLAs 570. During inference, i.e when the set of trained MLAs 570 is used to make predictions, the set of trained MLAs 570 may use at least one of the first model 562, the second model 564, and the third model 566 to recognize insects in images captured by the camera 62, 362.

In one or more embodiments, the server 420 is configured to execute the set of trained MLAs 570 to make predictions by receiving images from the insect monitoring system 10, 100.

It will be appreciated that the set of trained MLAs 570 may be transmitted to an electronic device and used to perform insect recognition and/or may be used directly by the server 420 to perform insect recognition. In one or more embodiments, the set of trained MLAs 570 is transmitted to a processor and non-transitory storage medium included in the insect monitoring system 10, 100, such that insect recognition is performed by the insect monitoring system 10, 100.

During inference, the set of trained MLAs 570 receives images 568 of the ICN 340 captured by the camera 62, 362. In one or more embodiments, the images 568 are transmitted from the insect monitoring system 10, 100 to the server 420 over the communication network 450. In one or more embodiments, the controller 44 may transmit the captured images 235 to the set of trained MLAs 570.

It will be appreciated that the images 568 may be received every time an image is captured, a predetermined number of images are captured, or may be received according to a schedule, level of insecticide, and the like.

The set of trained MLAs 570 then performs insect recognition on the captured images 568. In one or more embodiments, the set of trained MLAs 570 may use at least one of the first MLA model 562, the second MLA model 564, and the third MLA model 566 according to the sizes of the insects in the captured image 568.

It will be appreciated that the sizes of the insect may be determined by the set of trained MLAs 570 as part of an initial step, before it is processed by at least one of the first model 562, the second model 564, and the third model 566. In one or more embodiments, the insect sizes may be determined using other machine learning models and/or software routines.

The set of trained MLAs 570 performs insect recognition on the captured images 568, and outputs generated masks 572 for each recognized insect in the captured images 568. As a non-limiting example, each insect recognized by the set of trained MLAs 570 may have an associated generated mask 572 which indicates which pixels in the respective captured image 568 belongs to the respective recognized insect, as well as a respective confidence score indicative of the confidence of the set of trained MLAs 570 in the prediction, i.e. the type of recognized insect and/or the mask. In one or more embodiments, the generated mask 572 may be a bounding box. In one or more other embodiments, the generated mask 572 is a segmentation mask. It will be appreciated that there may be a single mask for each recognized insect in a captured image 568, or a single mask for each type of insects recognized in the captured image 568, i.e. a single mask may include one or more insects.

With brief reference to FIGS. 15A to 15C, non-limiting examples of images in with recognized insects 630, 632, 634 are illustrated.

Turning back to FIG. 14, in one or more embodiments, a confidence threshold comparison routine 576 is performed, where the respective confidence score of each of the predicted masks 572 is then compared to a predetermined confidence threshold. As a non-limiting example, the predetermined confidence threshold may be 98%.

If the respective confidence score of the generated mask in the generated masks 572 is above or equal to the predetermined confidence threshold the process may end at 578.

If the respective confidence score of the generated mask in the generated masks 572 is below the predetermined confidence threshold the respective generated mask and respective the captured image may be transmitted to an auto annotation routine 580, which are then used to train the set of MLAs 425 and the set of trained MLAs 570. It will be appreciated that instances of images with lower confidences scores may be reviewed by operators and provided for retraining and improving the prediction ability of the set of trained MLAs 570.

In one or more embodiments, an insect ratio routine 582 is performed using the output of the trained MLA 570 to determine ratios of insects and natural enemies in the captured images 568.

An identification routine 584 is then performed to identify populations of insects and natural enemies in the environment of the insect monitoring system 10, 100 from which the captured images 568 were received. The identification routine 584 may use statistical methods to estimate populations of insects and natural enemies, which may enable for example to select insecticides to control insect populations. This data may in turn be provided to and used by the e-commerce platform 440 to provide users with recommendations and purchase opportunities.

Insect Monitoring Application

Figures 16A, 16B:
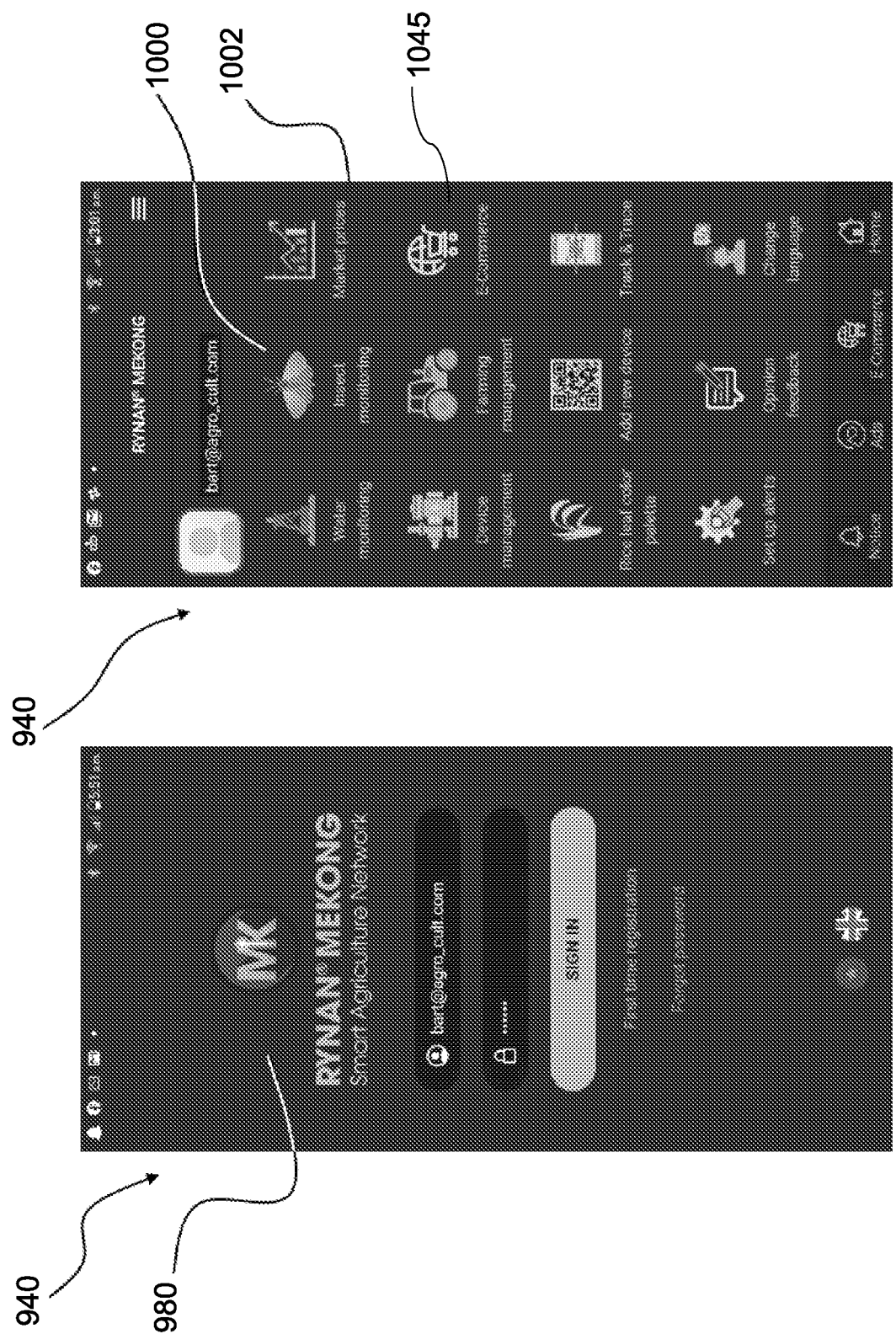
FIG. 16A to FIG. 16O provide screen grabs of an insect monitoring application in accordance with one or more non-limiting embodiments of the present technology.
Figures 16C, 16D:
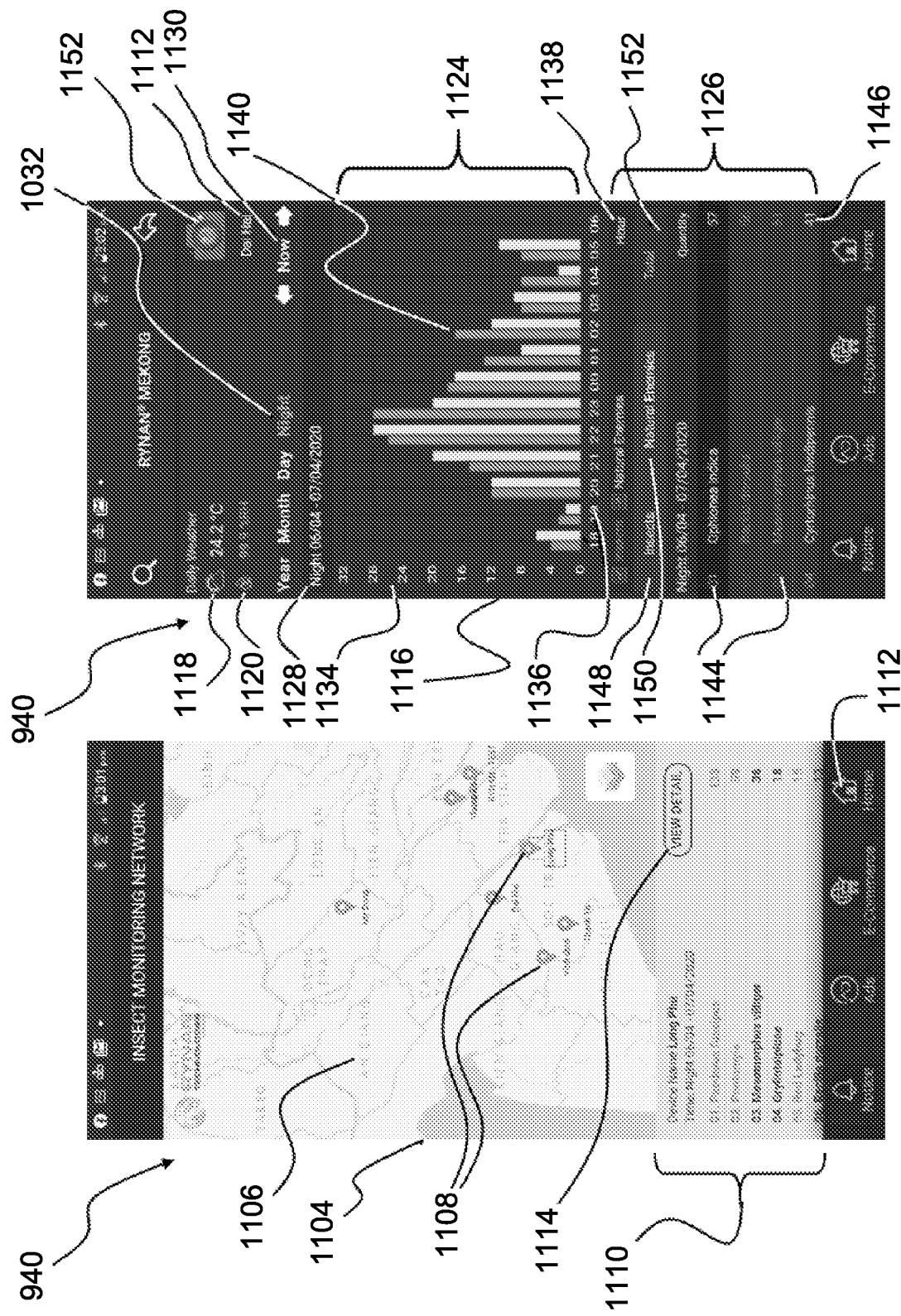
Figures 16E, 16F:
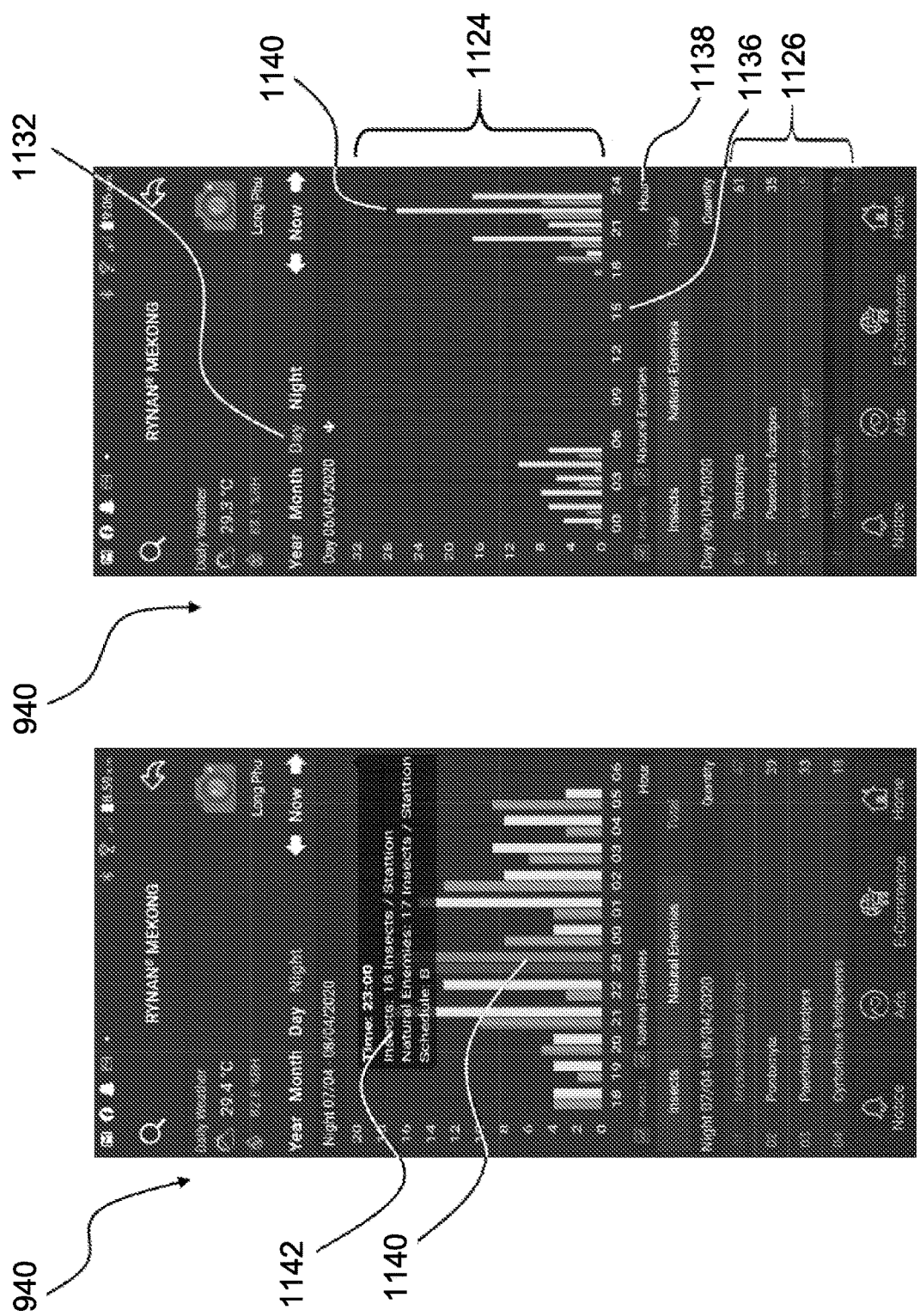
Figures 16G, 16H:
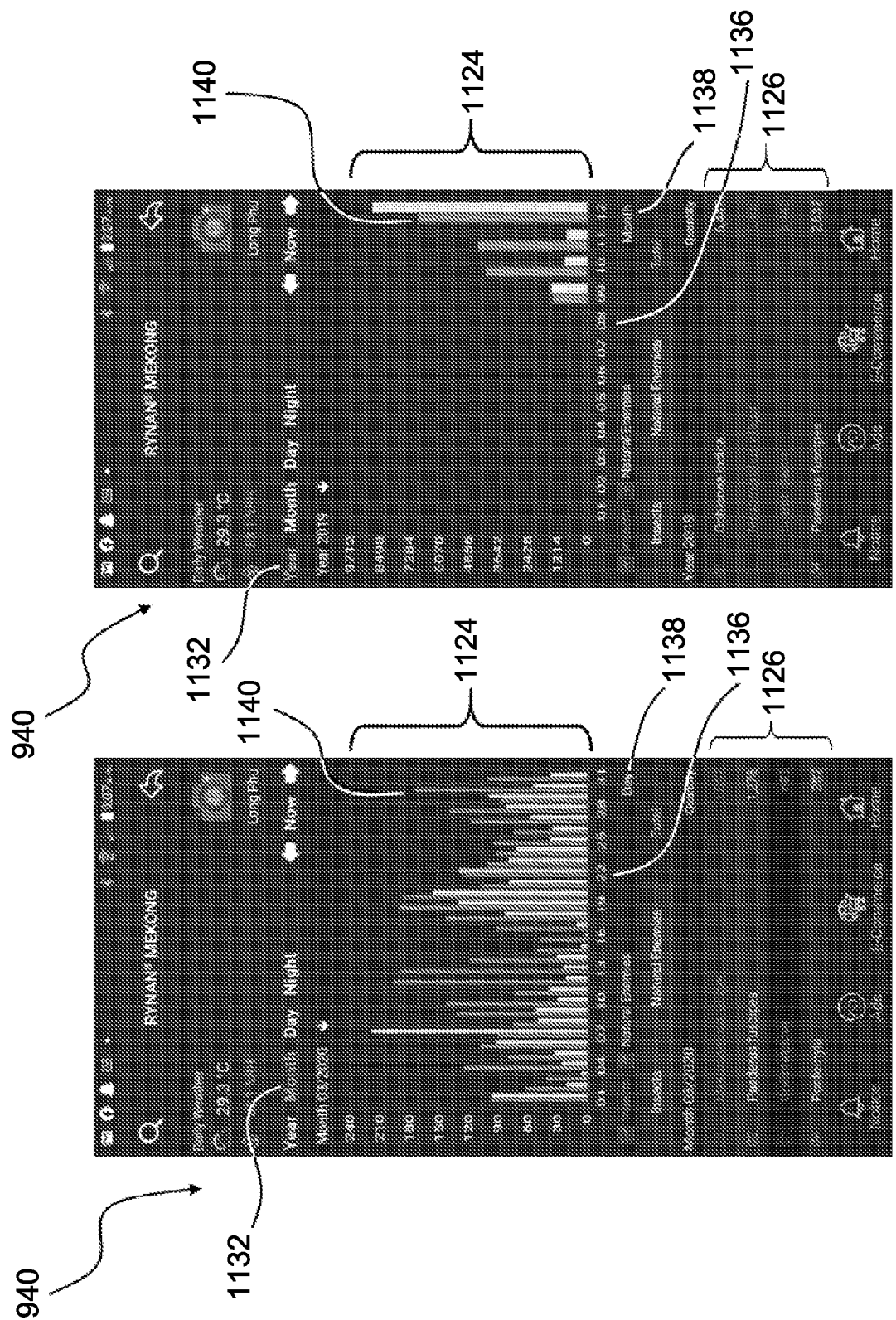
Figure 16L:
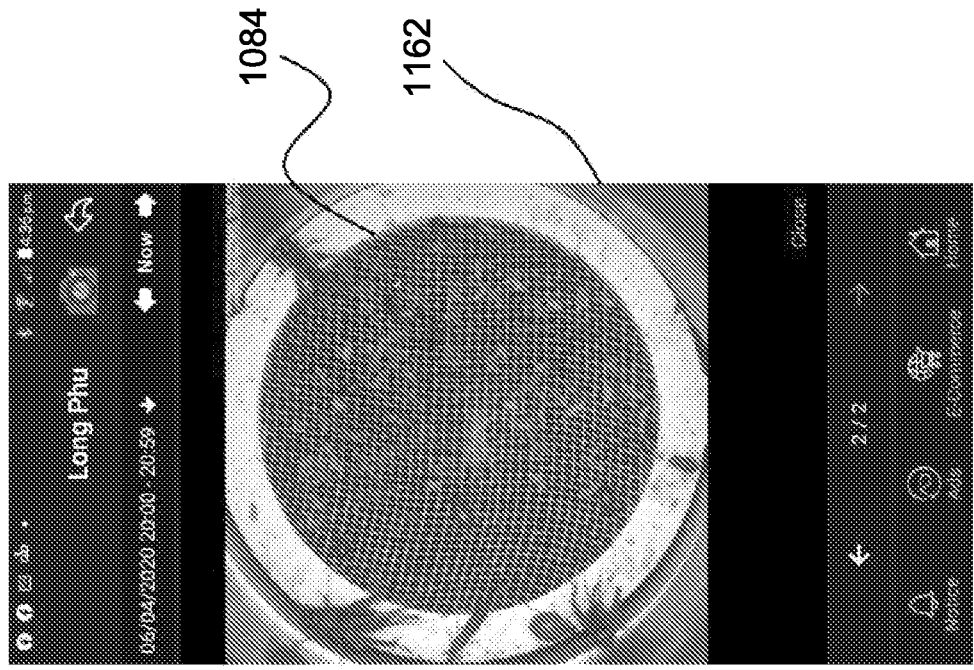
Figure 16K:
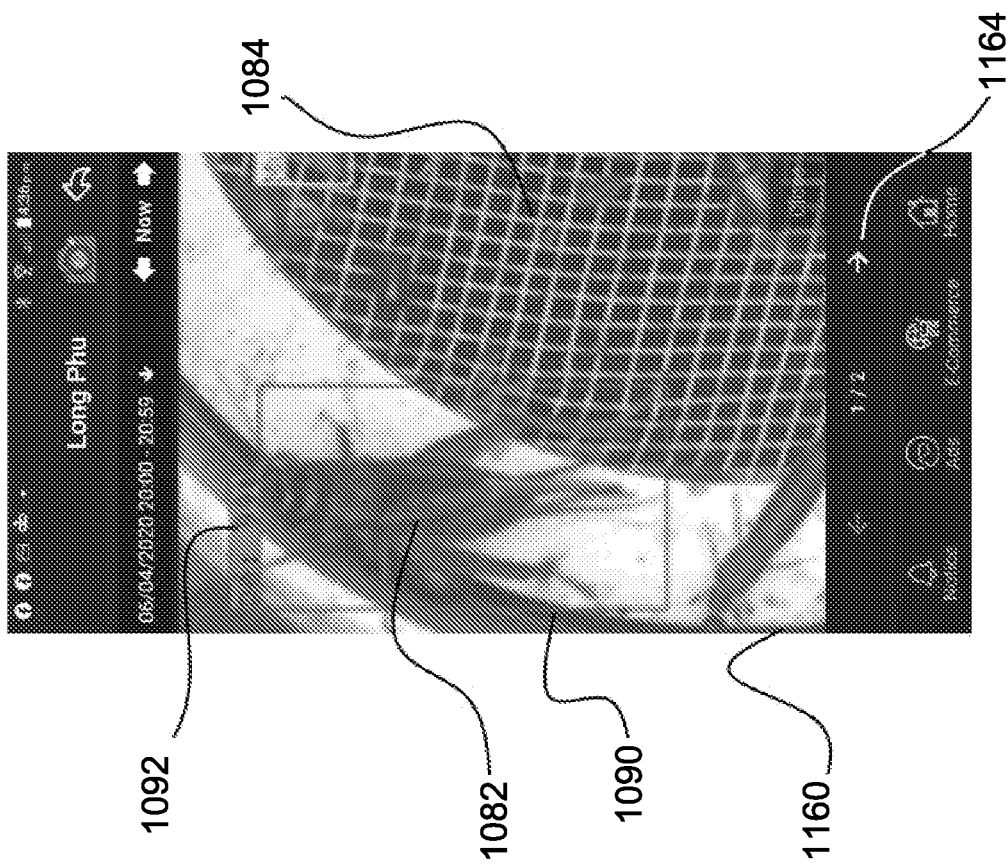
Figure 16N:
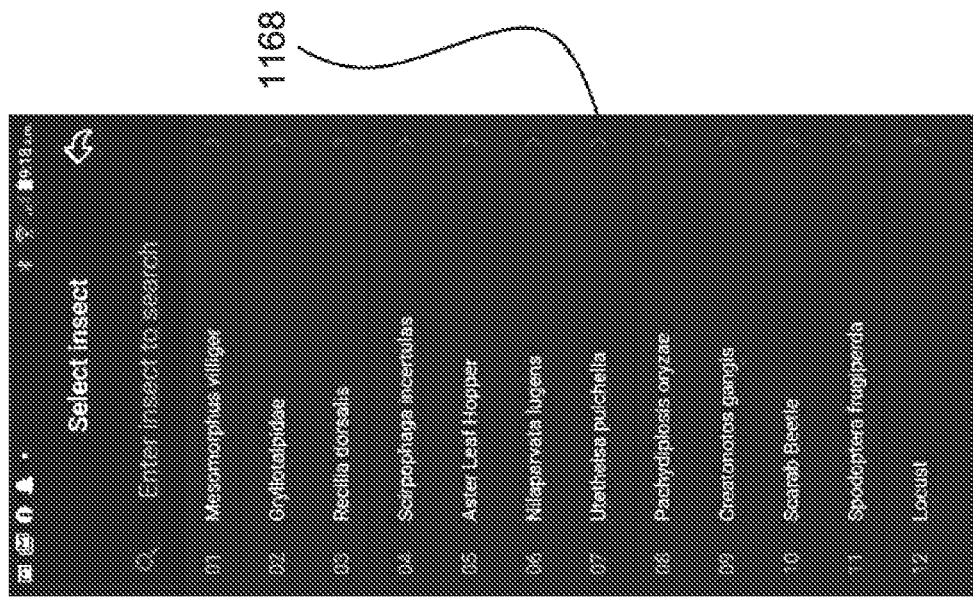
Figure 16M:
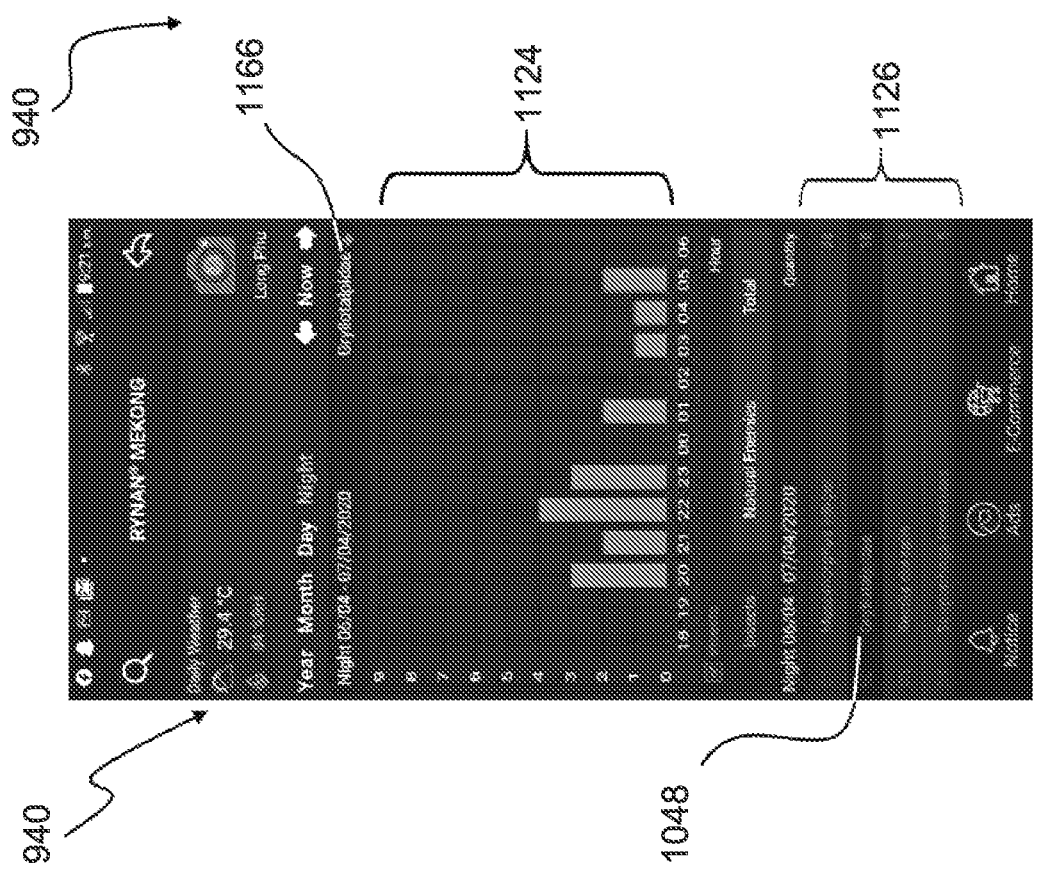
Figure 16O:
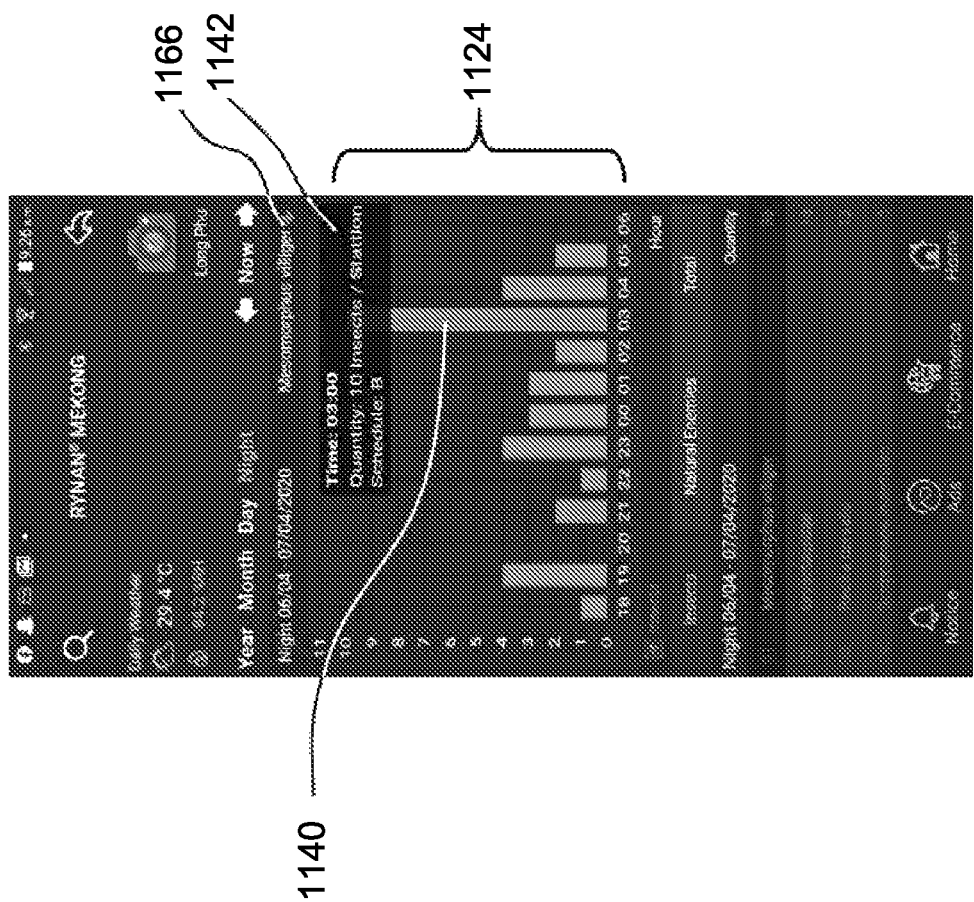

Referring now to FIGS. 16A to 16O, the application 940 will now be described in accordance with one or more non-limiting embodiments of the present technology.

A user such as the user of the first client device 432 can access data relating to one or more the plurality of insect monitoring systems 410 using the application 940.

In one or more embodiments, the user may access the application 940, by signing in via a login page 98 and selecting an insect monitoring icon 1000 from the home page 102 at which point the user will arrive at an insect monitoring network page 104.

The insect monitoring network page 1104 displays a map 1106 on which are displayed icons 1108 representing one or more of a plurality of insect monitoring systems 410. Data 1110 related to the insect monitoring system 10, 100 associated with a selected one of the icons 108/the plurality of insect monitoring systems 410 such as the name, date and number and type of insects counted and recognized by the set of trained MLAs 570, is displayed on the insect monitoring network page 1104 together with the map. Additionally, linked icons 1112 are provided to return to the home page 1102 for example.

Referring to FIG. 16D in addition to FIG. 16C, additional data regarding the selected insect monitoring system 10, 100 of the plurality of insect monitoring systems 410 can be displayed by selecting the view detail button 1114 which causes the selected insect monitoring system data display page 1116 to be displayed.

A variety of information regarding the selected insect monitoring system of the plurality of insect monitoring systems 410 is provided such as current temperature 1118, humidity 1120, name 1122. Additionally, detailed data regarding the number of insects observed at the selected insect monitoring system 10,100 is displayed in both a chart 1124 and tabular 126 form. In this regard, the time period 1128 of observed insect data to be displayed can be selected using a scroll widget 1130. Additionally, the range 1132 of observed insect data to be displayed, such as year, month, day or night (night is illustratively between 6 pm and 6 am where heightened insect activity is normally observed and the effectiveness of the set of LEDs 250 is maximized) can be selected using a range widget 1132. As will be discussed in more detail below, for each selected range (year, month, day, night) the charted and tabulated data is displayed. In this regard the range is divided into sub ranges. As a non-limiting example, the range "night" from 6 pm to 6 am is divided into subranges of one (1) hour each and the observed insects charted on a per hour basis.

Still referring to FIG. 16D, the ordinate 1134 of the charted results is the number of observed insects/natural enemies while the abscissa 1136 of the charted results represents the selected range and is divided into the subrange, wherein the duration of the subrange 1138 is also provided. Each column 1140 illustratively indicates the number of insects or natural enemies observed during the subrange (e.g. per hour) as recognized by the set of trained MLAs 570.

Referring to FIG. 16E, by selecting one or other of the columns 1140, a pop-up window 1142 providing specific data as to the subrange and observed insects during the subrange may be displayed.

Referring back to FIG. 16D, as discussed above tabulated results 1126 of the observed insects are provided below the charted results 1124. Initially the total count of insects (pests and natural enemies) observed over the time range is displayed separated by observed insect type 1144 and respective count 1146. As will be discussed in more detail below, an insect only tab 1148, a natural enemy only tab 1150, as well as a total observed insect tab 1152 are provided selection of which provides that respectively the tabulated results for observed insects (pests), observed natural enemies, or observed pests and observed natural enemies combined over the range is displayed alone. Additionally, the charted and tabulated results are illustratively color coded to indicate whether they represent insects (pests) or natural enemies of the insects, illustratively using respectively red and green.

Referring now to FIGS. 16F to 16H, as discussed above selection of a different range (respectively night, month and year are shown) via the range widget 1132 changes the abscissa 1136 of the charted results 1124, the range 1132 of observed insect data to be displayed in the tabulated results 126 as well as the subrange 138 represented by the columns 1140 of the chart 126.

Referring back to FIG. 16D, annotated versions of the images 1084 of the observed insects 516 may be viewed via the application 940 by selecting the image icon 1152, which, with reference to FIG. 16I, presents the user with an image viewer page 1154. As discussed above with reference to FIG. 13, the displayed images are analyzed by the user to determine the number and type of observed insects held against the mesh 1080 of the ICN 340 and can be annotated to include a color coded bounding box 1090 and label 1092 including the identified insect type. Images 1084 of observed insects from different subranges can be selected via the range widget 1130. With reference to FIG. 16J, manipulation of the range widget 1130 initiates the pop-up of a date and time selection control 156 and via which an image 1084 from a particular date and time 1158 can be selected.

Referring now to FIG. 16K in addition to FIG. 16I, a zoomed image 1160 function is provided allowing a user to examine the images 1084 of observed insects 1082 in more detail, for example in order to verify within a bounding box 1090 the type of insect identified as well as to better read the label 1092.

Referring now to FIG. 16L in addition to FIG. 16K, a non-annotated image 1084 may also be viewed by migrating to a non-annotated page 1162 using a page selection widget 1064.

Referring again to FIG. 16D in addition to FIG. 16M, by selecting the insect (pests) only tab 1148 the tabulated results 1126 are modified to show only the type and number of insects observed during the range and the charted results 1124 modified to show only a selected one of the insect types. In this regard, a given insect type may be selected by selecting one of the observed insect types 1144. The name of the selected insect type is also displayed in a name widget 1166 adjacent the chart 1124.

Referring to FIG. 16N in addition to FIG. 16M, alternatively an insect type may be selected by manipulating the name widget 1166 which initiates a select insect page 168.

Referring now to FIG. 16O in addition to FIGS. 16M and 16N, on selection of a given type of insect using one of the tabulated results 1126 and the select insect type page 1168, the charted results 1124 are updated to reflect only the observed number of insects of the selected type during the indicated range selection of one or other of the columns 1140 provides a pop-up window 1142 providing specific data as to the subrange of the selected insect type which, as discussed above, is provided via the name widget 166.

In one or more embodiments, the user may access the e-commerce platform 440 via the home page 1102, by selecting the e-commerce icon 1045. As explained herein above, the e-commerce platform 440 provides products for sale. In one or more embodiments, the e-commerce platform 440 provides specific recommendations of products such as insecticides based on the analysis of observed insects and natural enemies.

Figure 17:
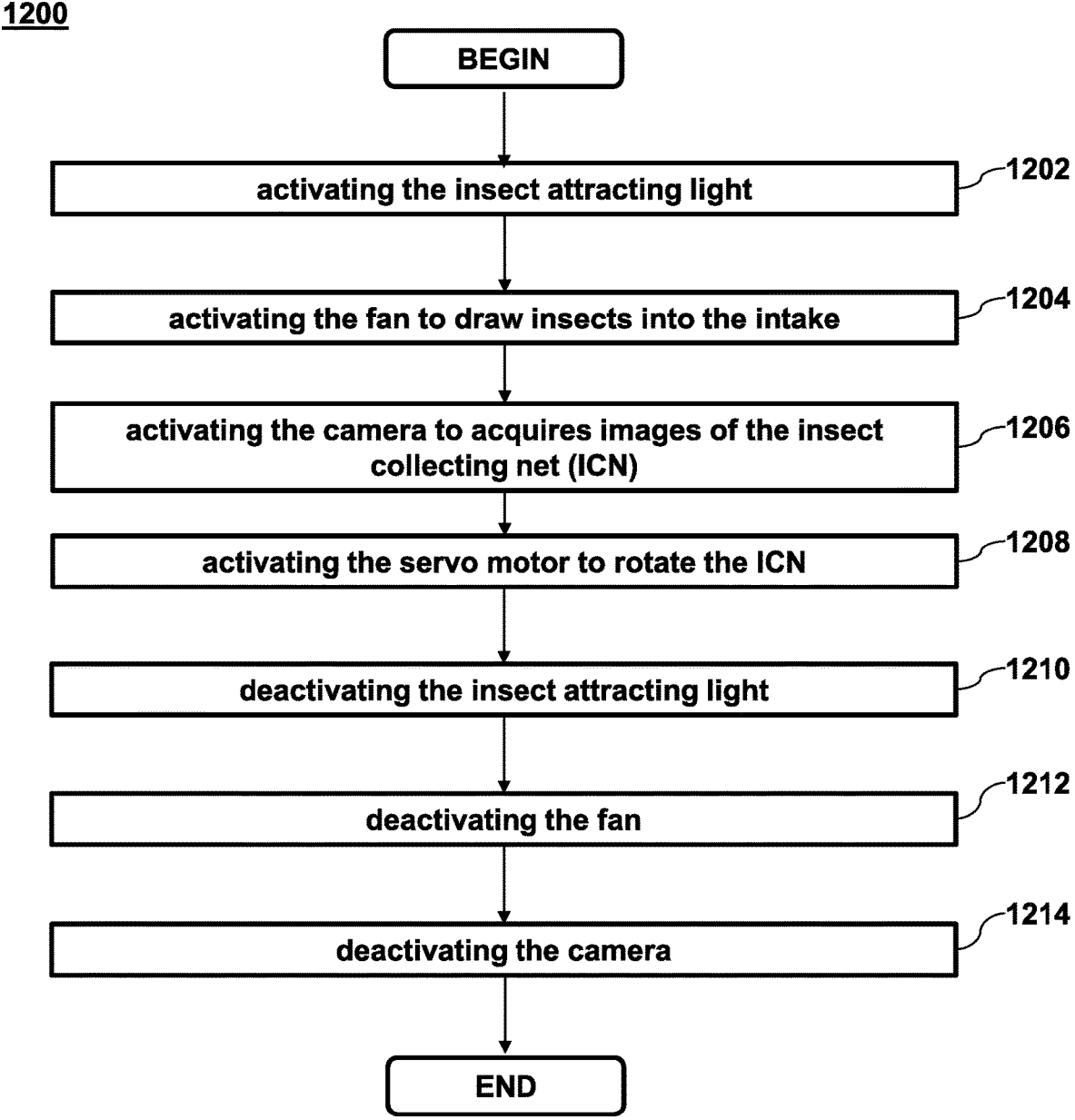
FIG. 17 provides a flow chart of a method of operating an insect monitoring system in accordance with one or more non-limiting embodiments of the present technology.

With reference to FIG. 17, there is depicted a flow chart of a method 1200 of operating an insect monitoring system 10,100 in accordance with one or more non-limiting embodiments of the present technology.

In one or more embodiments, the method 1200 is executed at least in part by a processing unit connected to one or more of the fan 322, the set of LEDs 250, the camera 62, the servo motor 348, the second servo motor 356. It will be appreciated that the processing unit may be connected to one or more of the components via a wired connection or a wireless connection without departing from the scope of the present technology. It is contemplated that the processing unit may be located within the insect monitoring device 10, 100 or outside the insect monitoring system.

In one or more embodiments, the processing unit is the controller 44.

In one or more embodiments, the processing unit is operatively connected to a non-transitory storage medium which includes computer-readable instructions causing the processing unit to execute the method 1200

In one or more alternative embodiments, the method 1220 may be executed by an operator having access to each of the components of the insect monitoring system 10, 100.

In one or more embodiments the method 1200 is executed according to a predetermined schedule, such as every day at sunset.

The method 1200 begins at step 1202.

At step 1202, the processing unit causes activation of the insect attracting light. In one or more embodiments, the insect attracting light comprises at least one of the set of LEDs 250. As a non-limiting example, once activated the insect attracting light may emit light at a wavelength between 350 and 650 nm.

In one or more embodiments, the insect attracting light is activated by receiving a signal from an electronic device connected to the insect attracting light.

At step 1204, the processing unit causes activation of the fan 322 such that insects attracted by the insect attracting light are drawn into the intake 24, 240 by the airflow and trapped against the ICN 340.

In one or more embodiments, the insects are drawn into intake 240, and pass through the first pipe 310 and the second pipe 312 and are held substantially immobile against the ICN 340 due to the airflow generated by the fan 322.

In one or more embodiments, the fan 322 receives a signal which causes the fan 322 to be activated.

It will be appreciated that step 1204 may be executed before step 1202, concurrently with step 1202, or after step 1202.

At step 1206, the processing unit causes activation of the camera 62, 362 to acquire or capture an image of the ICN 340. The camera 62, 362 may acquires images according to a predetermined amount of time, such as every 15 minutes.

In one or more embodiments, the processing unit causes activation of the lighting array 64, 378 such that the ICN 340 is illuminated when the camera 62, 362 captures images of the ICN 340 which may comprise one or more insects.

At step 1208, the processing unit causes activation of the servo motor 348 which rotates the ICN 340 such that the insects 516 held against the ICN 340 are released via the exhaust 60.

It will be appreciated that steps 1206 and 1208 may be executed repetitively according to a predetermined schedule such that a plurality of images are captured.

At step 1210, the processing unit causes deactivation of the insect attracting light. In one or more embodiments, the insect attracting light comprises at least one of the set of LEDs 250

At step 1212, the processing unit causes deactivation of the fan 322. Step 1210 may be executed after a predetermined amount of time or according to a predetermined schedule.

At step 1214 the processing unit causes deactivation of the camera 62, 362 such that the camera does not capture images of the ICN 340. In one or more embodiments, the processing unit causes deactivation of the lighting array 64, 378 such that the lighting array 64, 378 does not emit light when the camera is not acquiring images of the ICN 340.

In one or more embodiments where the ICN assembly 330 comprises the cleaning mechanism 358 and the second servo motor 356, the processing unit may cause the second servo motor 356 to be activated for moving the cleaning blades of the cleaning mechanism 358 to remove insects from at least a portion of the ICN assembly 330.

The method 1200 ends.

Figure 18:
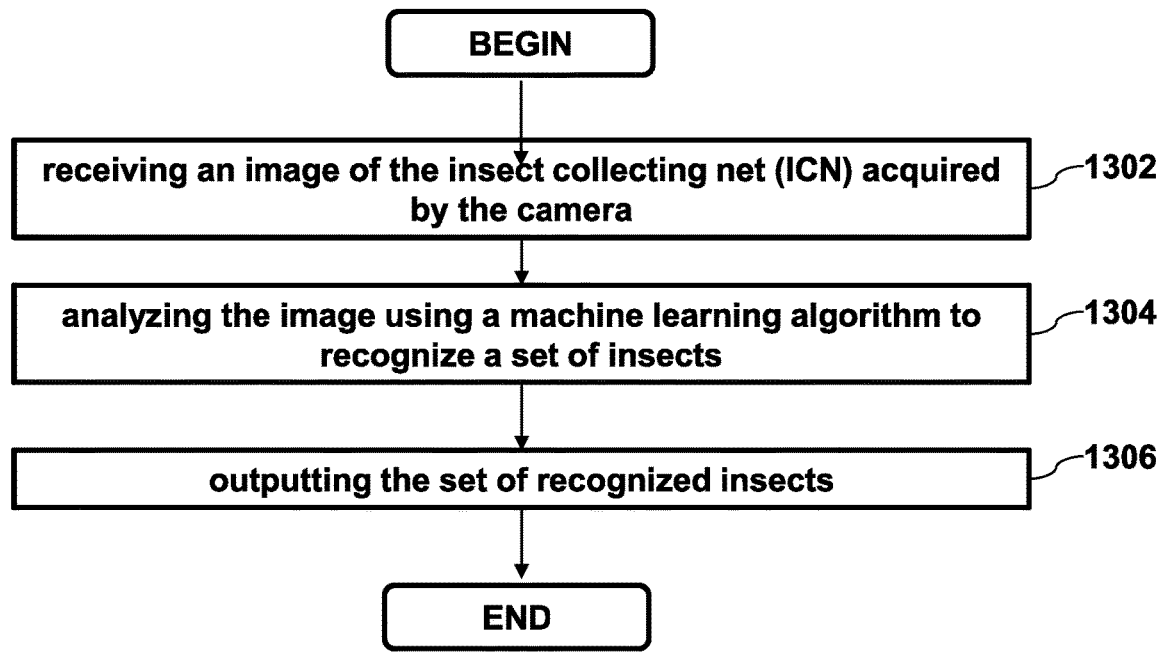
FIG. 18 provides a flow chart of a method of insect recognition in accordance with one or more non-limiting embodiments of the present technology.

With reference to FIG. 18, there is depicted a flow chart of a method 1300 of insect recognition in accordance with one or more non-limiting embodiments of the present technology.

In one or more embodiments, the method 1300 is executed by the server 420. The server 420 executes the set of trained MLAs 570, the set of trained MLAs 570 having been trained to perform insect recognition. In one or more embodiments, the set of trained MLAs 570 comprises one or more models, where each model has been trained to recognize insects of different sizes. As a non-limiting example, the server 420 may execute a first MLA model 562, a second MLA model 564, and a third MLA model 566 for respectively recognizing insects of sizes between 1 and 7 mm, between 8 and 15 mm, and longer than 15 mm.

It will be appreciated that the sizes of the insect may be determined by the set of trained MLAs 570 as part of an initial step, before it is processed by at least one of the first model 562, the second model 564, and the third model 566. In one or more embodiments, the insect sizes may be determined using other machine learning models and/or software routines.

It will be appreciated that the method 1300 may be executed by any electronic device comprising a processor and a non-transitory storage medium connected to the processor, which executes the set of trained MLAs 570. In one or more embodiments, the method 1300 is executed by an electronic device located within the insect monitoring system 10, 100.

The method 1300 may be executed after the method 1200.

The method 1300 begins at step 1302.

At processing step 1302, the server 420 receives an image 568 of the ICN 340 acquired by the camera 62, 362 of the insect monitoring system 10, 100. It will be appreciated that the server 420 may receive one image, or a plurality of images.

At processing step 1304, the server 420 analyzes, using at least one of the set of trained MLAs 570, the image 568 to recognize a set of insects, each recognized insect being associated with an insect identifier indicative of a type of insect. In one or more embodiments, each recognized insect is associated with a predicted mask, which may be a bounding box or a segmentation mask.

As part of the analysis, the server 420 determines the number of insects according to their types or identifiers.

In one or more embodiments, the server 420 may use at least one of the first MLA model 562, the second MLA model 564, and the third MLA model 566 according to the sizes of the insects in the image 568.

At processing step 1306, the server 420 outputs the set of recognized insects.

In one or more embodiments, the set of recognized insects is output in the form of an image with masks and labels of insect identifiers and/or insect types for each recognized insects. In one or more embodiments, a list of recognized insects is output with the image, with a count for each type of recognized insects.

Additionally, the server 420 may acquire from the database 460, based on the list of recognized insects, additional information such as the presence of natural enemies in the list of recognized insects and output the information.

As a non-limiting example, the server 420 may transmit the output information for display to one of the plurality of client devices 430 associated with the insect monitoring system 10,100 having acquired the image 568.

The method 1300 ends.

What is claimed is:

1. An insect monitoring system comprising:
an insect attracting light;
an intake positioned adjacent the insect attracting light;
an exhaust;
an airflow conduit extending between the intake and the exhaust;
a motorized fan for creating an airflow in the airflow conduit from the intake to the exhaust;
a movable insect collecting mesh positioned in the airflow conduit between the intake and the exhaust, said movable insect collecting mesh being rotatively mounted in the airflow conduit to be movable from a first position for forcing the airflow through the movable insect collecting mesh and a second position for releasing insects to the exhaust;
a movable cleaning blade for scraping the movable insect collecting mesh when placed in the second position;
a digital camera positioned to capture images of the movable insect collecting mesh; and
a controller operatively connected to each of the insect attracting light, the motorized fan, the movable inset collecting mesh, the movable cleaning blade and the digital camera, the controller being operable to cause:
activation of the insect attracting light;
activation of the motorized fan such that insects attracted by the insect attracting light are drawn into the intake and airflow conduit by the airflow and trapped against the movable insect collecting mesh when in the first position;
acquisition of images by the at least one digital camera; and
activation of the movable cleaning blade when the movable insect collecting mesh is in the second position.

2. The insect monitoring system of claim 1, wherein the controller is further operable to cause:
deactivation of the insect attracting light; and
deactivation of the motorized fan.

3. The insect monitoring system of claim 1, wherein the movable insect collecting mesh is movable by a first servo motor operatively connected to the controller.

4. The insect monitoring system of claim 3, wherein the movable cleaning blade is movable by a second servo motor operatively connected to the controller.

5. The insect monitoring system of claim 1, further comprising:
a lighting array positioned adjacent the digital camera for illuminating the movable insect collecting mesh; and
wherein
the controller is further operable to cause activation of the lighting array in an insect attraction mode, and deactivation of the lighting array in a stand-by mode.

6. The insect monitoring system of claim 1, wherein the insect attracting light is operable to emit light at a wavelength between 350 nm and 650 nm.

7. The insect monitoring system of claim 1, wherein the controller is operable according to a predetermined schedule.

8. The insect monitoring system of claim 1, further comprising a communication module for transmitting and receiving data over a communication network.

9. The insect monitoring system of claim 1, further comprising:
a processor operatively connected to the digital camera, the processor having access to a machine learning algorithm (MLA) having been trained for insect recognition, the processor being configured for:
receiving the images acquired by the digital camera;
analyzing, using the MLA, the images to determine a set of recognized insects, each recognized insect being associated with an insect identifier indicative of a type of insect; and
outputting the set of recognized insects.

10. The insect monitoring system of claim 9, wherein each recognized insect is associated with a prediction score indicative of a confidence of the MLA in recognizing the insect.

11. The insect monitoring system of claim 10, wherein each recognized insect is associated with a bounding box indicative of an approximate location and size of the recognized insect in the images.

12. The insect monitoring system of claim 11, wherein each recognized insect is associated with a mask at least partially indicative of pixels belonging to the recognized insect in the images.

13. The insect monitoring system of claim 9, wherein the outputting the set of recognized insects comprises outputting a number of each type of recognized insect.

14. The insect monitoring system of claim 9, wherein the MLA comprises a convolutional neural network (CNN) or a region proposal network (RPN).

15. The insect monitoring system of claim 9, further comprising:
   determining, based on the set of recognized insects, a ratio of natural enemies in the set of recognized insects.

16. The insect monitoring system of claim 9, wherein
   the insect monitoring system is connected to a database, preferably by a server; and
   wherein
   the processor is further configured for:
      querying the database based on the set of recognized insects to obtain insecticide recommendations.

17. The insect monitoring system of claim 16, further comprising:
   a client device connected to the server, the client device being operable to:
   receive the set of recognized insects from the server.

18. The insect monitoring system of claim 17, wherein the client device is connected to the insect monitoring system.

19. The insect monitoring system of claim 17, wherein the server is further configured for:
   determining, based on the set of recognized insects, insecticide recommendations; and
   transmitting the insecticide recommendations to the client device and providing an e-commerce application for sale of products and services responsive to the recommendations, preferably including a price and means for online ordering.

20. The insect monitoring system of claim 19, wherein the transmitting the insecticide recommendations to the client device comprises transmitting a recommendation of at least one additional product or service available from the e-commerce application such as an agricultural nutrient, a replacement part for the insect monitoring system or a service call for servicing the insect monitoring system.

* * * * *